United States Patent
Yoshida et al.

(10) Patent No.: US 9,782,982 B2
(45) Date of Patent: *Oct. 10, 2017

(54) INK JET RECORDING METHOD, ULTRAVIOLET CURABLE INK AND INK JET RECORDING APPARATUS

(71) Applicant: Seiko Epson Corporation, Tokyo (JP)

(72) Inventors: Atsushi Yoshida, Matsumoto (JP); Keitaro Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 13/851,426

(22) Filed: Mar. 27, 2013

(65) Prior Publication Data

US 2013/0258016 A1    Oct. 3, 2013

(30) Foreign Application Priority Data

Mar. 29, 2012 (JP) ................... 2012-076469
Sep. 14, 2012 (JP) ................... 2012-202377
Oct. 25, 2012 (JP) ................... 2012-235414

(51) Int. Cl.
*B41J 2/21*     (2006.01)
*B41J 11/00*    (2006.01)
(Continued)

(52) U.S. Cl.
CPC .......... *B41J 11/002* (2013.01); *B41J 2/2107* (2013.01); *B41M 7/0081* (2013.01); *C09D 11/101* (2013.01); *C09D 11/30* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 2,692,256 A   10/1954  Bauer
4,303,924 A   12/1981  Young, Jr.
(Continued)

FOREIGN PATENT DOCUMENTS

EP   0 997 508 A1   5/2000
EP   2 017 311 A1   1/2009
(Continued)

OTHER PUBLICATIONS

BASF Product Brochure (no date available), Coatings that stay looking good: BASF performance additive. (online) Retrieved by examiner Jun. 26, 2014, <URL: http://www.basf.com/group/corporate/us/en/literature-document:Brand+Chimassorb-Brochure—Coatings+that+stay+looking+good+BASF+performance+additive-English.pdf>

(Continued)

*Primary Examiner* — Manish S Shah
(74) *Attorney, Agent, or Firm* — Nutter McClennen & Fish LLP; John J. Penny, Jr.; Alex Nagomiy

(57) ABSTRACT

An ink jet recording method includes discharging a ultraviolet curable ink of which viscosity is 7 mPa·s or more at 20° C. from a head toward a recording medium, and curing the ultraviolet curable ink adhered to the recording medium, wherein, in the discharging, the temperature of the ultraviolet curable ink discharged is 20 to 30° C., and the viscosity of the ultraviolet curable ink at the temperature is 13 mPa·s or less.

20 Claims, 1 Drawing Sheet

(51) Int. Cl.
*B41M 7/00* (2006.01)
*C09D 11/101* (2014.01)
*C09D 11/30* (2014.01)

(58) Field of Classification Search
CPC .... B41J 2/1755; B41J 2/2114; B41J 11/0015; B41J 11/002; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/21; B41M 5/5218
USPC .. 347/100, 95, 102, 88, 99, 103, 96, 21, 20; 106/31.6, 31.27, 31.13; 523/160, 161
See application file for complete search history.

(56) References Cited

U.S. PATENT DOCUMENTS

| | | | |
|---|---|---|---|
| 4,577,205 A | 3/1986 | Shibata et al. | |
| 5,266,106 A | 11/1993 | Breton | |
| 5,275,646 A | 1/1994 | Marshall et al. | |
| 5,596,027 A | 1/1997 | Mead et al. | |
| 5,641,346 A | 6/1997 | Mantell et al. | |
| 5,889,084 A | 3/1999 | Roth | |
| 5,897,695 A | 4/1999 | Mayo et al. | |
| 6,187,897 B1 | 2/2001 | Kawashima et al. | |
| 6,310,115 B1 | 10/2001 | Vanmaele et al. | |
| 7,963,625 B2 | 6/2011 | Okada | |
| 8,227,047 B2 | 7/2012 | Loccufier et al. | |
| 8,664,291 B2 | 3/2014 | Kida et al. | |
| 9,034,940 B2 | 5/2015 | Kida et al. | |
| 9,056,986 B2 | 6/2015 | Kagose et al. | |
| 9,458,338 B2 | 10/2016 | Kagose et al. | |
| 9,493,667 B2 | 11/2016 | Kida et al. | |
| 2001/0036978 A1 | 11/2001 | Kohler et al. | |
| 2003/0162868 A1 | 8/2003 | Stretanski et al. | |
| 2004/0075726 A1* | 4/2004 | Hirai | 347/102 |
| 2004/0106700 A1 | 6/2004 | Yamanouchi et al. | |
| 2006/0050116 A1 | 3/2006 | Nakajima | |
| 2006/0203024 A1 | 9/2006 | Kusunoki | |
| 2007/0035594 A1 | 2/2007 | Brooks et al. | |
| 2007/0229612 A1 | 10/2007 | Oyanagi et al. | |
| 2008/0166495 A1 | 7/2008 | Maeno et al. | |
| 2008/0199631 A1* | 8/2008 | Makuta et al. | 347/100 |
| 2008/0218574 A1* | 9/2008 | Furuno et al. | 347/100 |
| 2008/0239045 A1 | 10/2008 | Umebayashi et al. | |
| 2008/0249795 A1 | 10/2008 | Walker | |
| 2008/0254234 A1 | 10/2008 | Fink et al. | |
| 2009/0000508 A1 | 1/2009 | Edison et al. | |
| 2009/0040249 A1 | 2/2009 | Wouters et al. | |
| 2009/0041946 A1 | 2/2009 | Fukumoto et al. | |
| 2009/0053484 A1 | 2/2009 | Yoshihiro et al. | |
| 2009/0068418 A1 | 3/2009 | Iwase et al. | |
| 2009/0099277 A1* | 4/2009 | Nagvekar et al. | 522/153 |
| 2009/0118388 A1 | 5/2009 | Naruse et al. | |
| 2009/0145638 A1 | 6/2009 | Toyoda et al. | |
| 2009/0197988 A1 | 8/2009 | Kito et al. | |
| 2009/0208651 A1 | 8/2009 | Oyanagi et al. | |
| 2009/0280302 A1* | 11/2009 | Fukumoto et al. | 428/195.1 |
| 2009/0289999 A1 | 11/2009 | Takahashi et al. | |
| 2009/0303304 A1 | 12/2009 | Oyanagi et al. | |
| 2010/0073437 A1 | 3/2010 | Shibata et al. | |
| 2010/0079566 A1 | 4/2010 | Ishikawa | |
| 2010/0080925 A1 | 4/2010 | Araki et al. | |
| 2010/0112497 A1 | 5/2010 | Takabayashi et al. | |
| 2010/0313782 A1* | 12/2010 | Loccufier et al. | 101/483 |
| 2010/0330296 A1 | 12/2010 | Loccufier et al. | |
| 2011/0015294 A1 | 1/2011 | Kito et al. | |
| 2011/0085013 A1 | 4/2011 | Onishi et al. | |
| 2011/0091790 A1 | 4/2011 | Barnwell et al. | |
| 2011/0165387 A1 | 7/2011 | Kondo | |
| 2011/0234680 A1* | 9/2011 | Aoyama et al. | 347/20 |
| 2011/0241264 A1 | 10/2011 | Yokoi | |
| 2012/0014005 A1 | 1/2012 | Kliem | |
| 2012/0075394 A1 | 3/2012 | Ohnishi | |
| 2012/0083545 A1 | 4/2012 | Kida et al. | |
| 2012/0113201 A1 | 5/2012 | Kagose et al. | |
| 2012/0128890 A1 | 5/2012 | Mirchev | |
| 2012/0140005 A1 | 6/2012 | De Voeght et al. | |
| 2012/0147095 A1 | 6/2012 | Miura et al. | |
| 2012/0235414 A1 | 9/2012 | Levy | |
| 2012/0252919 A1 | 10/2012 | Suzuki et al. | |
| 2012/0274717 A1 | 11/2012 | Nakano et al. | |
| 2013/0002773 A1 | 1/2013 | Fujii et al. | |
| 2013/0010039 A1 | 1/2013 | Kida et al. | |
| 2013/0063535 A1 | 3/2013 | Yoda et al. | |
| 2013/0250019 A1 | 9/2013 | Sato et al. | |
| 2013/0258018 A1 | 10/2013 | Nakajima et al. | |
| 2013/0286120 A1 | 10/2013 | Kobayashi et al. | |
| 2013/0286121 A1 | 10/2013 | Fukumoto et al. | |
| 2014/0063154 A1 | 3/2014 | Gould et al. | |
| 2014/0104356 A1 | 4/2014 | Kitade et al. | |
| 2014/0128496 A1 | 5/2014 | Kida et al. | |
| 2014/0132682 A1 | 5/2014 | Kida et al. | |
| 2014/0212634 A1 | 7/2014 | Kameyama et al. | |
| 2015/0225581 A1 | 8/2015 | Kida et al. | |
| 2015/0240094 A1 | 8/2015 | Kagose et al. | |
| 2016/0001578 A1 | 1/2016 | Kobayashi et al. | |
| 2016/0046134 A1 | 2/2016 | Fukumoto et al. | |
| 2016/0152044 A1 | 6/2016 | Yoshida et al. | |
| 2017/0002221 A1 | 1/2017 | Kida et al. | |
| 2017/0087876 A1 | 3/2017 | Nakajima et al. | |

FOREIGN PATENT DOCUMENTS

| | | | |
|---|---|---|---|
| EP | 2 266 812 A2 | 12/2010 | |
| EP | 2305762 A1 | 4/2011 | |
| EP | 2 335 940 A1 | 6/2011 | |
| EP | 2 399 966 A1 | 12/2011 | |
| EP | 2399965 A1 | 12/2011 | |
| EP | 2 412 765 A1 | 2/2012 | |
| EP | 2543707 A1 | 1/2013 | |
| EP | 2568022 A2 | 3/2013 | |
| JP | 60-210678 A | 10/1985 | |
| JP | 2000-052596 A | 2/2000 | |
| JP | 2000-169511 A | 6/2000 | |
| JP | 2002-326976 A | 11/2002 | |
| JP | 2003-089198 A | 3/2003 | |
| JP | 2003-200559 A | 7/2003 | |
| JP | 2003-292855 A | 10/2003 | |
| JP | 3461501 B1 | 10/2003 | |
| JP | 2004-067991 A | 3/2004 | |
| JP | 2004-098553 A | 4/2004 | |
| JP | 2004-167873 A | 6/2004 | |
| JP | 2004-196936 A | 7/2004 | |
| JP | 2004-224841 A | 8/2004 | |
| JP | 2005-103854 A | 4/2005 | |
| JP | 2005-212412 A | 8/2005 | |
| JP | 2005-214395 A | 8/2005 | |
| JP | 2006-069025 A | 3/2006 | |
| JP | 2006-219625 A | 8/2006 | |
| JP | 2006-231795 A | 9/2006 | |
| JP | 2006-248042 A | 9/2006 | |
| JP | 2006-257350 A | 9/2006 | |
| JP | 2007-118409 A | 5/2007 | |
| JP | 2007-136766 A | 6/2007 | |
| JP | 2007-138070 A | 6/2007 | |
| JP | 2007-185852 A | 7/2007 | |
| JP | 2007-245630 A | 9/2007 | |
| JP | 2008-001003 A | 1/2008 | |
| JP | 2008-001849 A | 1/2008 | |
| JP | 2008-507598 A | 3/2008 | |
| JP | 2008-163080 A | 7/2008 | |
| JP | 2008-179136 A | 8/2008 | |
| JP | 2008-207425 A | 9/2008 | |
| JP | 2008-246832 A | 10/2008 | |
| JP | 2008-254312 A | 10/2008 | |
| JP | 2008280383 A * | 11/2008 | ............... B41J 2/01 |
| JP | 2009-000961 A | 1/2009 | |
| JP | 4204333 B2 | 1/2009 | |
| JP | 2009-035650 A | 2/2009 | |

(56) References Cited

FOREIGN PATENT DOCUMENTS

| | | |
|---|---|---|
| JP | 2009-040880 A | 2/2009 |
| JP | 2009-073945 A | 4/2009 |
| JP | 2009-096043 A | 5/2009 |
| JP | 2009-096910 A | 5/2009 |
| JP | 2009-146624 A | 7/2009 |
| JP | 2009-185157 A | 8/2009 |
| JP | 2009-191183 A | 8/2009 |
| JP | 4321050 B2 | 8/2009 |
| JP | 4335955 B1 | 9/2009 |
| JP | 2009-279830 A | 12/2009 |
| JP | 2009-279848 A | 12/2009 |
| JP | 2009-285853 A | 12/2009 |
| JP | 2009-292091 A | 12/2009 |
| JP | 2010-012629 A | 1/2010 |
| JP | 2010-023285 A | 2/2010 |
| JP | 2010-100833 A | 5/2010 |
| JP | 2010-131975 A | 6/2010 |
| JP | 2010-138315 A | 6/2010 |
| JP | 2010-143974 A | 7/2010 |
| JP | 2010-143982 A | 7/2010 |
| JP | 2010-167677 A | 8/2010 |
| JP | 2009-057548 A | 9/2010 |
| JP | 2010-269471 A | 12/2010 |
| JP | 2010-280828 A | 12/2010 |
| JP | 2011-025684 A | 2/2011 |
| JP | 2011-051107 A | 3/2011 |
| JP | 2011-098455 A | 5/2011 |
| JP | 2011-235566 A | 5/2011 |
| JP | 2011-126269 A | 6/2011 |
| JP | 2011-143344 A | 7/2011 |
| JP | 2011-523370 A | 8/2011 |
| JP | 2011-184609 A | 9/2011 |
| JP | 2011-0184610 A | 9/2011 |
| JP | 2011-208018 A | 10/2011 |
| JP | 2011-225848 A | 11/2011 |
| JP | 2011-240565 A | 12/2011 |
| JP | 2012-000883 A | 1/2012 |
| JP | 2012-012478 A | 1/2012 |
| JP | 2012-020481 A | 2/2012 |
| JP | 2012-046724 A | 3/2012 |
| JP | 2012-072271 A | 4/2012 |
| JP | 2012-077222 A | 4/2012 |
| JP | 2012-092291 A | 5/2012 |
| JP | 2012-207084 A | 10/2012 |
| JP | 2012/172973 A1 | 12/2012 |
| JP | 2013-010832 A | 1/2013 |
| JP | 2013-047305 A | 3/2013 |
| JP | 2013-053208 A | 3/2013 |
| JP | 5772032 B2 | 9/2015 |
| WO | 2006/085992 A2 | 8/2006 |
| WO | 2007/094446 A1 | 8/2007 |
| WO | 2007/126103 A1 | 11/2007 |
| WO | 2009/053305 A1 | 4/2009 |
| WO | 2010/029017 A1 | 3/2010 |
| WO | 2010/069758 A1 | 6/2010 |
| WO | 2011/039081 A1 | 4/2011 |

OTHER PUBLICATIONS

Keskin et al., "2-Mercaptothioxanthone as sensitizers and coinitiators for aclyphosphine oxide potoinitiators for free radical polymerization," Macromolecules, 2008, v. 41, pp. 4631-4634.

Green, W.A., Commercial photoinitiators, Chapter 4, Industrial Photoinitiators, A Technical Guide. CRC Press, Taylor & Francis Group, 2010, pp. 75-114.

* cited by examiner

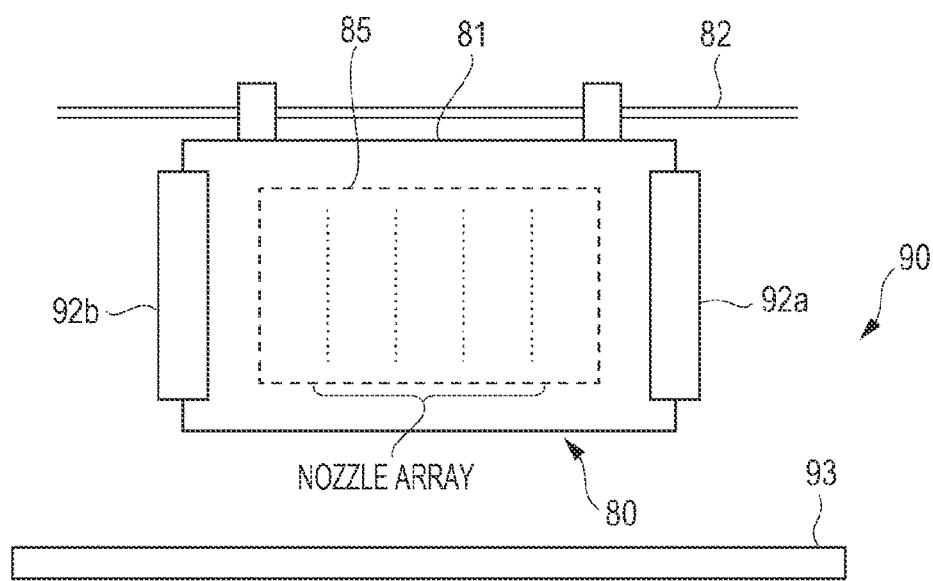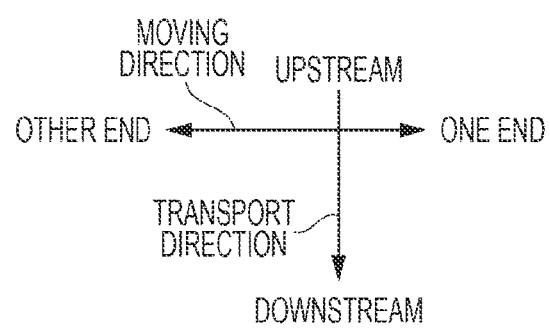

INK JET RECORDING METHOD, ULTRAVIOLET CURABLE INK AND INK JET RECORDING APPARATUS

BACKGROUND

1. Technical Field

The present invention relates to an ink jet recording method, a ultraviolet curable ink and an ink jet recording apparatus.

2. Related Art

In the related art, various methods have been used as recording methods for forming an image on a recording medium such as paper based on image data signals. Among these, an ink jet method has a low running cost since image formation is performed directly on a recording medium by discharging an ink only to the image area needed using inexpensive apparatus, and the ink can be used efficiently. Furthermore, an ink jet method is excellent as a recording method since noise is low.

In recent years, ink jet recording methods using a ultraviolet curable ink in which a polymerizable compound is photopolymerized (cured) by irradiating with ultraviolet have been used in manufacturing a color filter, printing to printed circuit boards, plastic cards, vinyl sheets, large billboards and plastic parts, and printing a bar code and date since an image having excellent scratch resistance and water resistance can be formed on the recording surface of a recording medium.

For example, JP-A-2009-40880 discloses an ink composition set provided with an ink composition A1 formed from 2-(vinyloxyethoxy)ethyl acrylate and a hyperbranched polymer, and an ink composition B1 formed from 2-(vinyloxyethoxy)ethyl acrylate, a photopolymerization initiator (Irgacure 819 and Irgacure 127 manufactured by Chiba Specialty Chemicals, Inc.), Pigment Black 7, and a dispersant (a polyoxyalkylene polyalkylene polyamine) (paragraphs 0083, 0084 and 0087 of JP-A-2009-40880).

However, there is room for improvement in each ink composition constituting the ink composition set disclosed in JP-A-2009-40880 in terms of curing properties of the ink, curing wrinkles occurring with the curing of the ink, and a line width.

SUMMARY

Accordingly, one advantage of some aspects of the invention is to provide an ink jet recording method using a ultraviolet curable ink that is excellent in curing, in inhibiting curing wrinkles, and has an excellent line width. Furthermore, another advantage of some aspects of the invention is to provide an ink jet recording method using a ultraviolet curable ink that is excellent in inhibiting curing wrinkles, and has an excellent line width. An excellent line width refers to the characteristics of the line width becoming thick when the evaluation of the line width is performed.

The inventors have found that, as a result of intensive investigations, the above problems can be solved using an ink jet recording method including a discharging step for discharging a predetermined ultraviolet curable ink from a head toward a recording medium, the temperature and viscosity of the ink being in a predetermined range, and a curing step for curing the ultraviolet curable ink adhered to the recording medium, and have completed the invention.

That is, the first invention is as follows.

[1] An ink jet recording method which includes discharging a ultraviolet curable ink containing vinyl ether group-containing (meth)acrylic acid esters represented by the following General Formula (I), and a monofunctional (meth)acrylate other than the vinyl ether group-containing (meth)acrylic acid esters, and of which viscosity is 7 mPa·s or more at 20° C., from a head toward a recording medium, and curing the ultraviolet curable ink adhered to the recording medium, wherein, in the discharging, the temperature of the ultraviolet curable ink discharged is 20 to 30° C., and the viscosity of the ultraviolet curable ink at the temperature is 13 mPa·s or less,

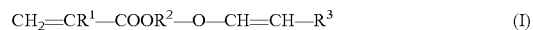

$$CH_2=CR^1—COOR^2—O—CH=CH—R^3 \quad (I)$$

(In the formula, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.)

[2] The ink jet recording method according to [1], wherein recording is performed by alternately performing main scanning in which the discharging is carried out while moving the head in the main scanning direction, and the curing is carried out, and sub-scanning in which the relative position of the head and the recording medium is changed in the sub-scanning direction intersecting with the main scanning direction.

[3] The ink jet recording method according to [1] or [2], wherein the monofunctional (meth)acrylate contains a monofunctional (meth)acrylate having an aromatic ring skeleton.

[4] The ink jet recording method according to any one of [1] to [3], wherein there is 40 to 80% by mass of the vinyl ether group-containing (meth)acrylic acid esters with respect to the total mass of the ultraviolet curable ink.

[5] The ink jet recording method according to any one of [1] to [4], wherein there is 10 to 50% by mass of the monofunctional (meth)acrylate with respect to the total mass of the ultraviolet curable ink.

[6] The ink jet recording method according to any one of [1] to [5], wherein in the curing, the ultraviolet curable ink is irradiated with ultraviolet light having irradiation energy of 500 mJ/cm² or less from a ultraviolet light emitting diode having an emission peak wavelength in the range of 360 to 420 nm, and the ultraviolet curable ink is cured.

[7] The ink jet recording method according to any one of [1] to [6], wherein, in the curing, the ultraviolet curable ink is irradiated with ultraviolet light having a peak intensity of 800 mW/cm² or more from a ultraviolet light emitting diode having an emission peak wavelength in the range of 360 to 420 nm, and the ultraviolet curable ink is cured.

[8] The ink jet recording method according to [2], wherein, when a unit region that forms dots is employed as a pixel, and an array of pixels arranged in a main scanning direction is employed as a raster line, there is a raster line including pixels intended to form a dot by another main scanning in between raster lines including pixels intended to form a dot by one main scanning in a sub-scanning direction, and a plurality of raster lines arranged in the sub-scanning direction includes a raster line made of pixels intended to form a dot by a certain main scanning, and pixels intended not to form a dot by a certain main scanning but form a dot by another round of main scanning.

[9] The ink jet recording method according to any one of [1] to [8], wherein a distance between a nozzle surface of the head and a recording surface of the recording medium is 5 mm or more.

[10] A ultraviolet curable ink used in the ink jet recording method according to any one of [1] to [9].

[11] An ink jet recording apparatus that performs recording using the ink jet recording method according to any one of [1] to [8].

Furthermore, the second invention is as follows.

[1] An ink jet recording method which includes discharging a ultraviolet curable ink of which viscosity is 7 mPa·s or more at 20° C. from a head toward a recording medium, and curing the ultraviolet curable ink adhered to the recording medium, wherein, in the discharging, the temperature of the ultraviolet curable ink discharged is 20 to 30° C., and the viscosity of the ultraviolet curable ink at the temperature is 13 mPa·s or less, and in the curing, the ultraviolet curable ink is cured by irradiating with ultraviolet light having a peak intensity of 800 mW/cm$^2$ or more from a ultraviolet light emitting diode having an emission peak wavelength in the range of 360 to 420 nm.

[2] The ink jet recording method according to [1], wherein recording is performed by alternately performing main scanning in which the discharging is carried out while moving the head in the main scanning direction, and sub-scanning in which the relative position of the head and the recording medium is changed in the sub-scanning direction intersecting with the main scanning direction, and the main scanning includes curing the ultraviolet curable ink adhered to the recording medium.

[3] The ink jet recording method according to [1] or [2], wherein a light source arranged in the main scanning direction of the head is provided, and recording is performed by alternately performing main scanning in which the discharging is carried out while moving the head in the main scanning direction, and sub-scanning in which the relative position of the head and the recording medium is changed in the sub-scanning direction intersecting with the main scanning direction, the main scanning includes curing the ultraviolet curable ink adhered to the recording medium, a light source is provided at a downstream side in the sub-scanning direction of the head, and a curing is further performed after the curing included in the main scanning.

[4] The ink jet recording method according to [3], wherein at least one of the curing included in the main scanning and the curing further performed after the curing included in the main scanning includes curing the ultraviolet curable ink by irradiating with ultraviolet light having a peak intensity of 800 mW/cm$^2$ or more from a ultraviolet light emitting diode having an emission peak wavelength in the range of 360 to 420 nm.

[5] The ink jet recording method according to [3] or [4], wherein the curing further performed after the curing included in the main scanning includes curing the ultraviolet curable ink by irradiating with ultraviolet light having a peak intensity of 800 mW/cm$^2$ or more from a ultraviolet light emitting diode having an emission peak wavelength in the range of 360 to 420 nm, and the curing included in the main scanning includes curing the ultraviolet curable ink by irradiating with ultraviolet light having a peak intensity of less than 800 mW/cm$^2$ from a ultraviolet light emitting diode having an emission peak wavelength in the range of 360 to 420 nm.

[6] The ink jet recording method according to any one of [1] to [5], wherein the curing is performed using a plurality of curing, and the first curing performed after the discharging includes curing the ultraviolet curable ink by irradiating with ultraviolet light having a peak intensity of less than 800 mW/cm$^2$ from a ultraviolet light emitting diode having an emission peak wavelength in the range of 360 to 420 nm, and the curing performed after the above curing includes curing the ultraviolet curable ink by irradiating with ultraviolet light having a peak intensity of 800 mW/cm$^2$ or more from a ultraviolet light emitting diode having an emission peak wavelength in the range of 360 to 420 nm.

[7] The ink jet recording method according to any one of [1] to [6], wherein the ink contains 40 to 80% by mass of a monofunctional (meth)acrylate with respect to the total mass of the ink.

[8] The ink jet recording method according to any one of [1] to [7], wherein the ink contains 5 to 45% by mass of a polyfunctional (meth)acrylate with respect to the total mass of the ink.

[9] The ink jet recording method according to any one of [1] to [8], wherein a sum of the irradiation energy due to the curing is 500 mJ/cm$^2$ or less.

[10] The ink jet recording method according to any one of [2] to [9], wherein, when a unit region that forms dots is employed as a pixel, and an array of pixels arranged in a main scanning direction is employed as a raster line, there is a raster line including pixels intended to form a dot by another main scanning in between raster lines including pixels intended to form a dot by one main scanning in a sub-scanning direction, and a plurality of raster lines arranged in the sub-scanning direction includes a raster line made of pixels intended to form a dot by a certain main scanning, and pixels intending not to form a dot by a certain main scanning and form a dot by another round of main scanning.

[11] The ink jet recording method according to any one of [1] to [10], wherein a distance from a nozzle surface of the head to a surface of the recording medium is 5 mm or more.

[12] An ink jet recording apparatus that performs recording using the ink jet recording method according to any one of [1] to [11].

[13] A ultraviolet curable ink used in the ink jet recording method according to any one of [1] to [11].

BRIEF DESCRIPTION OF THE DRAWING

The invention will be described with reference to the accompanying drawing, wherein like numbers reference like elements.

FIGURE is a schematic diagram of a surrounding of a head of a serial printer that is one example of the recording apparatus of this embodiment.

DESCRIPTION OF EXEMPLARY EMBODIMENTS

Hereinafter, a first embodiment of the invention will be described in detail. In this specification, a "recorded material" refers to formation of a cured material in which an ink is recorded on a recording medium. In addition, a cured material in this specification means a material cured including a cured film or a coated film.

In addition, in this specification, "cure" refers to an ink being solidified by the polymerization of a polymerizable compound when light is irradiated on an ink that includes a polymerizable compound. "Curable" refers to a property of being cured by being sensitive to light, and is also referred to as photopolymerizable. A "curing wrinkle" refers to wrinkles occurring on the surface of the coating film after curing. A "filling property" is also known as a covering property, and refers to a property of a recording medium that is underlying being not visible when viewing a recorded material from the side of a cured material (image) being formed. "Scratch resistance" refers to a property of a cured material being difficult to peel off and difficult to become scratched when rubbing the cured material. "Storage stability" refers to a property of it being difficult for viscosity to change before and after storage when an ink is stored.

In addition, in this specification, "(meth)acrylate" means at least one of acrylate and the corresponding methacrylate, "(meth)acrylic" refers to at least one of acrylic and the corresponding methacrylic, and "(meth)acryloyl" refers to at least one of acryloyl and the corresponding methacryloyl.

Ink Jet Recording Method

One embodiment of the invention relates to an ink jet recording method. The ink jet recording method includes a discharging step for discharging a ultraviolet curable ink having a predetermined composition and physical properties from a head toward a recording medium, and a curing step for curing the ultraviolet curable ink adhered to the recording medium. In this way, a cured material of the ink is formed by the ink cured on the recording medium.

Recording Medium

Examples of the recording medium described above include a non-ink-absorbent or a low-absorbent recording medium. Among the recording media, examples of the non-ink-absorbent recording medium include those in which plastic is coated or a plastic film is adhered on a substrate such as a plastic film that is not surface treated for ink jet recording (that is, does not form an ink absorbing layer) or paper, or the like. Plastic referred to herein includes polyvinyl chloride (PVC), polyethylene terephthalate (PET), polycarbonate (PC), polystyrene (PS), polyurethane (PU), polyethylene (PE), polypropylene (PP), and the like. Examples of the low-ink-absorbent recording medium include a printing paper such as an art paper, a coated paper or a matte paper.

Discharging Step

A discharging step in this embodiment is for discharging a predetermined ultraviolet curable ink (hereinafter simply referred to as "ink") from a head toward a recording medium. The viscosity of the ink at 20° C. is 7 mPa·s or more. In addition, the temperature of the ultraviolet curable ink discharged is 20 to 30° C., and the viscosity of the ultraviolet curable ink discharged is 13 mPa·s or less. Furthermore, the viscosity of the ink at the discharging temperature may be 13 mPa·s or less, and the viscosity of the ink at 20° C. may or may not be 13 mPa·s or less.

The temperature of 20 to 30° C. described above corresponds to room temperature or near room temperature. Thus, if the temperature of the ink discharged is room temperature or near room temperature, the costs can be kept low since there is no need for temperature control such as providing a heating mechanism in a recording apparatus, and an advantageous effect such as discharge stability becoming favorable due to little variation in the temperature is obtained.

Furthermore, when the viscosity is 7 mPa·s or more at 20° C., the occurrence of curing wrinkles can be prevented. It is postulated that, in the film coating of the ink, curing wrinkles occur, when the inside of the coated film is cured later than the surface of the coated film after the curing of the surface of the coated film, by the surface of the coated film cured earlier being deformed, or the ink inside the cured film irregularly flowing before being cured. Furthermore, it is postulated that a ultraviolet curable ink having low viscosity shows a tendency to have a large polymerization shrinkage associated with curing (the difference between the volume of the ink and the volume of the ink (cured product) after curing with respect to the volume of the ink before curing having a predetermined mass), and therefore, the occurrence of curing wrinkles is significant. In addition, it is postulated that a ultraviolet curable ink containing vinyl ether-group containing (meth)acrylate represented by General Formula (I) described below is prone to the occurrence of curing wrinkles, and in particular, in a ultraviolet curable ink containing vinyl ether-group containing (meth)acrylate represented by General Formula (I), and having low viscosity as well, the occurrence of curing wrinkles is significant. The reason that the occurrence of curing wrinkles is prevented in this embodiment is postulated to be as follows. While the ink is a ultraviolet curable ink containing vinyl ether-group containing (meth)acrylate represented by General Formula (I), viscosity thereof is maintained in the range described above, therefore, the occurrence of curing wrinkles can be reduced. In addition, when the viscosity of the ink at the temperature of the ink discharged is 13 mPa·s or less, filling properties becomes excellent. It is postulated that the reason for the excellent filling properties is that the increase in viscosity due to temperature decrease, which may happen after discharge when the ink is heated can be prevented since the viscosity of the ink is low even without heating. In this way, in the recording method of this embodiment, the ultraviolet curable ink can be discharged without heating, therefore, advantageous effects can be obtained such that it is not necessary to provide a mechanism for heating in a recording apparatus using the recording method. However, the recording apparatus being provided with a heating mechanism is not excluded in any way. In addition, this embodiment is not limited in any way to the above postulations.

In addition, in order to further heighten the advantageous effects described above, the temperature of the ultraviolet curable ink discharged is preferably 23 to 28° C., and the viscosity of the ink at the temperature of the ink discharged is preferably 11 mPa·s or less. The viscosity of the ink at 20° C. is preferably 9 mPa·s or more.

In addition, in the ultraviolet curable ink, viscosity variation due to temperature variation at the time of discharge is large since the ultraviolet curable ink has higher viscosity than an aqueous ink used in ordinary ink jet inks. Such viscosity variation has large effects on the changes in droplet sizes and changes in droplet discharging rate, and consequently can cause image degradation. Therefore, it is preferable that the temperature of the ink discharged be kept constant as much as possible. Heating is not necessary in the ultraviolet curable ink of this embodiment since the temperature of the ink discharged is room temperature or near room temperature, and the temperature of the ink discharged can be maintained approximately constant. Therefore, the ultraviolet curable ink in this embodiment has excellent image quality.

Herein, one example of ink design methods for having the viscosity of the ink in a target range will be described.

The mixed viscosity of the entire polymerizable compounds included in the ink can be calculated from the viscosity of each polymerizable compound used, and the mass ratio of each corresponding polymerizable compound with respect to the ink composition.

Assuming that the ink includes polymerizable compounds A, B . . . (omitting the middle) . . . , and N, that is, N types of polymerizable compounds, the viscosity of the polymerizable compound A is made to be VA, and the mass ratio of the polymerizable compound A with respect to the total amount of the polymerizable compounds in the ink is made to be MA. The viscosity of the polymerizable compound B is made to be VB, and the mass ratio of the polymerizable compound B with respect to the total amount of the polymerizable compounds in the ink is made to be MB. Similarly, the viscosity of the polymerizable compound N is made to be VN, and the mass ratio of the polymerizable compound N with respect to the total amount of the polymerizable compounds in the ink is made to be MN. Affirmatively, the formula "MA+MB+ . . . (omitting the middle) . . . +MN=1" becomes satisfied. In addition, the mixed viscosity of the entire polymerizable compounds included in the ink is made to be VX. Then, the following Equation (1) can be assumed to be satisfied.

$$MA \times \text{Log } VA + MB \times \text{Log } VB + \ldots \text{(omitting the middle)} \ldots + MN \times \text{Log } VN = \text{Log } VX \qquad (1)$$

In addition, for example, when the ink includes two types of polymerizable compounds, the mass ratio of the polymerizable compounds later than MB are set to zero. The number of types of the polymerizable compounds can be any number of one or more.

Next, one example of a procedure (Steps 1 to 7) to have the viscosity of the ink in the desired range will be described.

First, information of the viscosity of each polymerizable compound to be used at a predetermined temperature is obtained (Step 1). The method of obtaining includes obtaining from manufacturers' catalogs and the like, or measuring the viscosity of each polymerizable compound at a predetermined temperature, and the like. As the viscosity of the single polymerizable compound, viscosity information according to the manufacturer of the polymerizable compound to be used can be preferably employed since the viscosities sometimes vary depending on the manufacturer even for the same polymerizable compound. Then, the target viscosity is set as VX, and the composition ratio (mass ratio) of each polymerizable compound based on the Formula (1) is determined so that VX becomes a target viscosity (Step 2). The target viscosity is a viscosity of the ink composition to be obtained ultimately, and is set to any viscosity within the range of 7 to 13 mPa·s. The predetermined temperature is set to any temperature within the range of 20 to 30° C.

Subsequently, the composition of the polymerizable compounds (hereinafter, referred to as "polymerizable composition") is prepared by actually mixing the polymerizable compounds, and the viscosity at a predetermined temperature is measured (Step 3). Then, if the viscosity of the polymerizable composition is approximately close to a target viscosity (in Step 4, the viscosity needs to be "target viscosity±5 mPa·s"), the viscosity of the ink composition is measured by preparing an ink composition including the polymerizable composition, and components other than the polymerizable compounds such as a photopolymerization initiator or a pigment (hereinafter, called "components other than the polymerizable compounds") (Step 4). In Step 4, if there is a component mixed with the ink composition in the form of a pigment dispersion liquid such as pigments as components other than the polymerizable compound, the ink composition needs to be prepared in the mass ratio in which there is subtraction of the mass ratio of the polymerizable compounds included in the ink composition as the pigment dispersion liquid from the composition ratio of each polymerizable compound determined in Step 2, since the polymerizable compounds included in the pigment dispersion liquid in advance are also included in the ink composition.

Subsequently, the difference between the measured viscosity of the polymerizable composition and the measured viscosity of the ink composition is calculated, and is made to be VY (Step 5). Herein, normally, "VY>0". VY varies depending on the comprisal conditions such as types and contents of the components other than the polymerizable compounds, however, in the examples described below, VY was 2.3 to 3 mPa·s.

Subsequently, "target viscosity of Step 2−VY" is defined as VX, and the composition ratio of each polymerizable compound is repeatedly determined from the above Formula (1) so that VX becomes "target viscosity of Step 2−VY" defined above (Step 6).

Subsequently, the ink composition is prepared by mixing each polymerizable compound having the composition ratio determined in Step 6 and the components other than the polymerizable compounds, and the viscosity is measured at a predetermined temperature (Step 7). If the viscosity measured is a target viscosity, the ink composition adjusted in Step 7 is obtained as the ink composition having a target viscosity.

On the other hand, in Step 3, if the measured viscosity of the polymerizable compounds prepared is not within the range of "target viscosity±5 mPa·s", the steps are repeated from step 3 after the following fine adjustment. First, if the measured viscosity is too high, a fine adjustment such as the content of the polymerizable compounds of which viscosity as a single substance is higher than a target viscosity being reduced, and the content of the polymerizable compounds of which viscosity as a single substance is lower than a target viscosity being increased is carried out. On the other hand, if the measured viscosity is too low, a fine adjustment such as the content of the polymerizable compounds of which viscosity as a single substance is lower than a target viscosity being reduced, and the content of the polymerizable compounds of which viscosity as a single substance is higher than a target viscosity being increased is carried out. Furthermore, in Step 7, if the measured viscosity of the ink composition prepared is not a target viscosity, Step 7 is repeated after the same adjustment as the above fine adjustment is made.

Curing Step

The curing step is for curing the ultraviolet curable ink adhered to the recording medium by irradiating with ultraviolet light (light) from a light source. In this step, initiating species such as radicals, acids and bases are generated by a photopolymerization initiator included in the ink being decomposed by the irradiation of ultraviolet light, and a photopolymerization reaction of the polymerizable compound is facilitated by the function of the initiating species. Alternatively, in this step, the photopolymerization reaction of the polymerizable compound is initiated by the irradiation of ultraviolet light. In this case, if a sensitizing dye is present in the ink together with the photopolymerization initiator, the sensitizing dye in the system absorbs ultraviolet light and becomes in an excited state, therefore, facilitating the decomposition of the photopolymerization initiator by being in contact with the photopolymerization initiator. As a result, a more sensitive curing reaction can be achieved.

A mercury lamp, a gas or solid-state laser, or the like is mainly used as a light source (ultraviolet light source), and a mercury lamp and a metal halide lamp are widely known as a light source used for curing a ultraviolet curable ink. Meanwhile, being mercury-free has been strongly required in view of current environmental protection, and replacing with GaN-based semiconductor ultraviolet light emitting devices is very useful from industrial and environmental viewpoints. In addition, an LED (light emitting diode) such as a ultraviolet light emitting diode (UV-LED) and a ultraviolet laser diode (UV-LD) has a small size, a long life, a high efficiency, and has a low cost, and is expected as a light source for a ultraviolet curable ink.

As a result, in the ultraviolet curable ink of this embodiment, either an LED or a metal halide lamp can be suitably used as a light source, however, a UV-LED is preferable among these.

The emission peak wavelength of the above light source (ultraviolet light source) is preferably in the range of 360 to 420 nm, and more preferably the range of 380 to 410 nm. The emission peak wavelength being within the above range is preferable since an UV-LED has low cost along with being readily obtained.

Furthermore, the peak intensity (peak intensity of irradiation) of ultraviolet light irradiated from a light source having an emission peak wavelength within the above range is preferably 800 mW/cm$^2$ or more, and more preferably 1,000 mW/cm$^2$ or more. If the peak intensity of irradiation is within the above range, curability is more excellent, and the occurrence of curing wrinkles is more effectively prevented. More particularly, as a result of delayed curing of the inside of the film coated with ink compared to the curing of the surface, the surface of the film coated with ink is cured first, and the occurrence of curing wrinkles is effectively prevented.

In addition, the value measured using a ultraviolet intensity meter UM-10 and a light receiving unit UM-400 (both manufactured by Konica Minolta Sensing, Inc.) can be employed as the peak intensity of irradiation in this specification. However, this does not mean limiting the method of measuring the peak intensity of irradiation, and measuring methods known in the related art can be used.

Furthermore, the ultraviolet curable ink that can be cured by irradiation energy of preferably 600 mJ/cm$^2$ or less, and more preferably 200 to 500 mJ/cm$^2$ from a light source having an emission peak wavelength in the above range can be used in the recording method of this embodiment. In this case, low cost printing and a high printing speed can be achieved along with the likely increase of the output of an LED. Herein, when the irradiation is carried out a plurality of times, the irradiation energy is the total irradiation energy that is a sum of each irradiation energy.

In addition, the irradiation energy in this specification is calculated by multiplying the irradiation time from the start to the end of irradiation and the peak intensity of irradiation. Furthermore, when the irradiation is carried out a plurality of times, the irradiation energy is represented by the amount of radiation energy that is a sum of a plurality of radiation. The emission peak wavelength may be one or the plural within the above preferable wavelength range. Even when there is more than one wavelength, the total amount of irradiation energy of ultraviolet light having a peak emission wavelength of the above range is made to be the above irradiation energy.

Such an ink can be obtained by including at least any one of the photopolymerization initiator decomposed by ultraviolet irradiation in the above-described wavelength range, and the polymerizable compounds initiating polymerization by ultraviolet irradiation in the above-described wavelength range.

Furthermore, a discharging amount of the ink (application amount, adhering amount) on the recording medium per unit area at the time of discharge is preferably 5 to 16 mg/inch$^2$ in order to have excellent filling properties and to prevent unnecessary use of the ink.

In addition, the discharging amount of the ink per unit area varies depending on recording resolution and the application amount of the ink per recording unit area (pixel) defined by recording resolution, but is preferably 300 dpi×300 dpi to 1500 dpi×1500 dpi, when the recording resolution (printing resolution) is represented by "resolution of sub-scanning direction×resolution of a direction intersecting with the sub-scanning direction (main scanning direction)". Then it is preferable that nozzle density of the head and the discharging amount be adjusted in accordance with this recording resolution. In addition, the discharging amount of the ink per pixel is preferably 2 to 200 ng/pixel, and more preferably 3 to 160 ng/pixel. Furthermore, the nozzle density (distance between the nozzles in a nozzle array) is preferably 180 to 720 dpi, and more preferably 300 to 720 dpi.

Thus, according to this embodiment, an ink jet recording method in which curability, suppression of curing wrinkles, and filling properties of a solid pattern image and a line width (main scanning direction and sub-scanning direction) are all excellent can be provided. In addition, hereinafter, the main scanning direction described is sometimes referred to as "transport direction of the recording medium", and the sub-scanning direction is sometimes referred to as "width direction of the recording medium".

Ink Jet Recording Apparatus

One embodiment of the invention relates to an ink jet recording apparatus, that is, an ink jet printer. In the recording apparatus, the ink jet recording method of the above embodiment can be used. A recording apparatus (printer) for carrying out the recording method will be described in detail.

The printer of this embodiment can record ink having different colors on a recording medium (form an image), and examples include an image being formed using inks of 4 colors of CMYK (cyan, magenta, yellow and black), or an underlying image that provides excellent concealing properties for a recording medium using a white ink being formed.

As the type of a printer of this embodiment, a line printer and a serial printer are included, or either of them may be used. These have different printing methods. A line printer that is an ink jet recording apparatus of a line fashion discharges an ink on a recording medium while a head has a nozzle array of the length (approximately) corresponding to the width of the recording medium, and the recording medium relatively moves position in the scanning direction intersecting with the width direction, and recording is performed in one path (single path) with the head being fixed without (almost) moving. Meanwhile, a serial printer that is an ink jet recording apparatus of a serial fashion performs recording in normally two paths or more (multi-path) while a head reciprocates (shuttle moves) in a direction perpendicular to the transport direction of the recording medium. In addition, the path can be paraphrased as "main scanning" described below.

Hereinafter, the printer of this embodiment will be described in more detail with reference to the drawings. Also, the scope of the invention is not limited to the following drawings in any way. In addition, in each drawing used in the following description, the scale of each member is appropriately changed in order to make the size of each member identifiable. FIGURE is a schematic diagram of a surrounding of a head of a serial printer which is one example of the recording apparatus of this embodiment.

A carriage unit 80 is a moving mechanism that moves, that is, scans a head 85 in a direction (hereinafter, referred to as a "moving direction" or a "main-scanning direction") intersecting with the transport direction (sub-scanning direction) while discharging the ink, with respect to the recording medium stationed in a recording area. The carriage unit 80 is provided with a carriage 81 and a carriage motor (not shown). In addition, the carriage 81 holds an ink cartridge (not shown) that accommodates a ultraviolet curable ink to be detachable. The carriage 81 reciprocates along a guide shaft 82 by the carriage motor while being supported on the guide shaft 82 intersecting with the transport direction described below.

The head 85 is for discharging ultraviolet curable ink with respect to the recording medium, and has a plurality of nozzles. The head 85 is provided in the carriage 81, therefore, when the carriage 81 is moved in the moving direction, the head 85 is also moved in the moving direction. Then, a dot array along the moving direction is formed on the recording medium by the head intermittently discharging the ultraviolet curable ink while moving in the moving direction. In addition, in moving the head 85, the ultraviolet curable ink is discharged while the head 85 is moved from one end to the other end of FIGURE, however, the ultraviolet curable ink is not discharged while the head 85 is moved from the other end to one end.

The distance between a nozzle surface of the head 85 and a recording surface of the recording medium is preferably 0.5 to 20 mm, and more preferably 1 to 15 mm in order to prevent the contact of the nozzle surface with the recording medium, and also to prevent shifting of the landing position of the ink. In particular, recording may be performed under the condition in which the distance described above is relatively large, and the distance in this case is preferably 5 to 20 mm, and more preferably 5 to 15 mm. The nozzle surface means a surface facing the recording medium in the nozzle plate of the head 85. In this specification, when the distance is not constant in the recording area of the recording medium due to the nozzle surface or the points of the recording surface, the maximum length among the distances between the nozzle surface and the recording surface is called a "distance" between the nozzle surface of the head 85 and the recording surface of the recording medium. In addition, examples of the case in which the distance is not constant include a case in which recording is performed on a recording medium having irregularities, which is disclosed in JP-A-2000-52596. In this case, it is preferable that recording be performed under the condition in which the distance described above is relatively large, and by doing so, recording that prevents the contact of the nozzle surface with the recording medium, and is very suitable for a recording medium having an irregular surface design can be performed while simplifying the recording control.

An irradiation unit 90 is for curing the ultraviolet curable ink by irradiating with ultraviolet light with respect to the ultraviolet curable ink adhered (landed) on a recording medium. Dots formed on the recording medium are cured and form a cured material by irradiating with ultraviolet light from the irradiation unit 90. The irradiation unit 90 includes first irradiation units 92a and 92b, and a second irradiation unit 93 at a downstream side in the transport direction of the head 85.

The first irradiation units 92a and 92b are for irradiating with ultraviolet light to cure the dots formed on the recording medium, and are located in front of the second irradiation unit 93 in which the same curing is carried out, that is, at an upstream side in the transport direction.

More specifically, whereas the first irradiation units 92a and 92b are for irradiating with ultraviolet light to preliminarily cure dots formed on the recording medium, the second irradiation unit 93 is for irradiating with ultraviolet light to mainly cure the dots preliminarily cured.

In this specification, "preliminary curing" means temporary fixing (pinning) of the ink, and more particularly, curing prior to main curing to prevent bleeding among the dots or to control the diameter of the dots. In general, the degree of polymerization of the polymerizable compounds in the preliminary curing is lower than the degree of polymerization of the polymerizable compounds in the main curing that is carried out after the preliminary curing. In addition, "main curing" refers to curing the dots formed on the recording medium to a state required to be used as a recorded material.

The second irradiation unit 93 is for irradiating with ultraviolet light for curing the dots formed on the recording medium (almost) completely, that is, for main curing. The second irradiation unit 93 is provided at a more downstream side in the transport direction than the head 85, and irradiates with ultraviolet light on the dots formed by the head 85.

In addition, the ink may be mainly cured by irradiating with ultraviolet light from at least one of the first irradiation units 92a and 92b and the second irradiation unit 93. Therefore, the curing step may end by irradiating with ultraviolet light from the second irradiation unit 93 without irradiating with ultraviolet light from the first irradiation units 92a and 92b. Furthermore, regardless of ultraviolet light being irradiated from the second irradiation unit 93, the main curing may be performed by irradiating with ultraviolet light from at least one of the first irradiation units 92a and 92b. When the main curing is performed in at least one of the first irradiation units 92a and 92b, there may be no second irradiation unit 93. Thus only main curing may be performed without preliminary curing in the curing step.

Thus, in this embodiment, the recording may be performed by alternately repeating the main scanning forming at least a portion of an image while moving the head 85 in the moving direction (main scanning direction), thereby discharging ink from the head 85 and curing the ink, and the sub-scanning changing the relative position of the head 85 and the recording medium in the transport direction (sub-scanning direction) intersecting with the main scanning direction. In other words, the main scanning is for carrying out the discharging step and the curing step, and the sub-scanning is for transporting the recording medium in the transport direction. Then, it is possible to complete an image on the recording medium by recording that repeats these main scanning and sub-scanning.

Furthermore, instead of the sub-scanning described above, the sub-scanning by the carriage unit 80 being moved in the sub-scanning direction without transporting the recording medium may be performed.

In addition, the recording method of this embodiment is preferably performed by a so-called overlap printing. Herein, the overlap printing in this embodiment will be described.

Overlap printing according to this embodiment includes the following first aspect or second aspect. Herein, a "raster line" means an array (dot array) made of pixels arranged in a single array in the main scanning direction.

In the first aspect, in one-time main scanning, there are pixels that form dots and pixels that do not form dots with respect to a single raster line, and a raster line is present that forms a single raster line by performing main scanning a plurality of times. Then, a single raster line can be formed through main scanning a plurality of times according to the first aspect. This aspect can be referred to as an "overlap raster line". In other words, in the overlap raster line, there are pixels that form dots in one-time main scanning, and pixels that do not form dots in the one-time main scanning, and form dots in another round of main scanning.

The second aspect is that, in addition to the first aspect, there are raster lines that form dots in another round of main scanning in between the raster lines that form dots in one-time main scanning in the sub-scanning direction. In other words, in between the raster lines that form dots in one-time main scanning, there are also raster lines that do not form dots in the one-time main scanning, and form dots in another round of main scanning.

In the overlap raster line described above, the number of paths forming dots is at least two, and may be three or more. In addition to this, among the total number of pixels in one raster line, it is preferable that 50% or more of pixels that form dots in one path be not adjacent to each other, and it is more preferable that 70% or more be not adjacent to each other. Moreover, among all the raster lines that form dots, it is preferable that 50% or more be an overlap raster line, and it is more preferable that 70% or more be an overlap raster line. Among the above, when the overlap printing provided with the second aspect is performed, dots formed in one-time main scanning can be dispersed in the main scanning direction and the sub-scanning direction.

As a result, according to this embodiment, an ink jet recording apparatus in which curability, suppression of curing wrinkles, and filling properties of a solid pattern image and a line width (main scanning direction and sub-scanning direction) are all excellent can be provided.

Ultraviolet Curable Ink

Furthermore, one embodiment of the invention relates to a ultraviolet curable ink. The ultraviolet curable ink can be used in the ink jet recording method and the ink jet recording apparatus of the above embodiment. As described above, in the ultraviolet curable ink, the viscosity at 20° C., the temperature at the time of discharge, and the viscosity at the corresponding temperature are in a predetermined range. The ink having the viscosity in a predetermined range can be designed by a calculation from the viscosity and the mass ratio (content ratio) of each single polymerizable compound as described above. The viscosity of the ink in this embodiment can be measured by using an E-type viscometer. When using an E-type viscometer, it is in a category of common sense to measure according to the instruction manual of the viscometer, therefore, it is needless to say that the types of a rotor or the rotational speed be set and measured so that the viscosity of the ink to be measured can be properly measured in accordance with the instruction manual, therefore, in this embodiment, it is obvious that the viscosity of the ink is set and measured so that the viscosity of the ink to be measured can be properly measured in accordance with the instruction manual.

Hereinafter, additives (components) that are included or may be included as desired in the ultraviolet curable ink (hereinafter, simply referred to as "ink") of this embodiment will be described.

Polymerizable Compound

A polymerizable compound included in the ink of this embodiment may cure the ink that is printed by being polymerized during the irradiation of light either alone or by the action of the photopolymerization initiator described below. The polymerizable compounds contain at least vinyl ether group-containing (meth)acrylic acid esters represented by General Formula (I), and other monofunctional (meth) acrylates.

Hereinafter, a polymerizable compound will be described in detail focusing on such (meth)acrylates.

1. Vinyl Ether Group-Containing (Meth)Acrylic Acid Esters

The ink of this embodiment includes vinyl ether group-containing (meth)acrylic acid esters represented by the following General Formula (I) as polymerizable compounds.

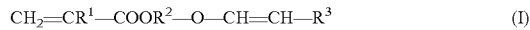

$$CH_2=CR^1-COOR^2-O-CH=CH-R^3 \qquad (I)$$

In the above Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

By including the vinyl ether group-containing (meth) acrylic acid esters, the ink can have excellent curability, and further have lower viscosity. In detail, it is preferable to use a compound having both a vinyl ether group and a (meth) acrylic group in one molecule rather than using a compound having a vinyl ether group and a compound having a (meth)acrylic group separately in order for favorable ink curability.

In General formula (I), the divalent organic residue having 2 to 20 carbon atoms represented by $R^2$ is preferably a linear, branched or cyclic alkylene group having 2 to 20 carbon atoms, which may be substituted, an alkylene group having 2 to 20 carbon atoms having an oxygen atom through an ether bond and/or an ester bond in the structure, which may be substituted, and a divalent aromatic group having 6 to 11 carbon atoms. Among these, an alkylene group having 2 to 6 carbon atoms such as an ethylene group, an n-propylene group, an isopropylene group and a butylene group, or an alkylene group having 2 to 9 carbon atoms having an oxygen atom through an ether bond in the structure such as an oxyethylene group, an oxy-n-propylene group, an oxy-isopropylene group and an oxybutylene group is preferably used.

In General formula (I), the monovalent organic residue having 1 to 11 carbon atoms represented by $R^3$ is preferably a linear, branched or cyclic alkyl group having 1 to 10 carbon atoms, which may be substituted, and an aromatic group having 6 to 11 carbon atoms, which may be substituted. Among these, an alkyl group having 1 or 2 carbon atoms such as a methyl group or an ethyl group, or an aromatic group having 6 to 8 carbon atoms such as a phenyl group and a benzyl group is preferably used.

When each of the organic residues is a group that may be substituted, the substituents are divided into a group that includes a carbon atom and a group that does not include a carbon atom. First, when the substituent is of a group that includes a carbon atom, the carbon atom is counted in the number of carbon atoms of the organic residue. Examples of the group that includes a carbon atom include, but are not limited to, a carboxyl group or an alkoxy group. Next, examples of the group that does not include a carbon atom include, but are not limited to, a hydroxyl group or a halo group.

Examples of the vinyl ether group-containing (meth) acrylic acid esters include, but are not limited to, 2-vinyloxyethyl(meth)acrylate, 3-vinyloxypropyl(meth)acrylate, 1-methyl-2-vinyloxyethyl(meth)acrylate, 2-vinyloxypropyl (meth)acrylate, 4-vinyloxybutyl(meth)acrylate, 1-methyl-3-vinyloxypropyl(meth)acrylate, 1-vinyloxymethylpropyl (meth)acrylate, 2-methyl-3-vinyloxypropyl(meth)acrylate, 1,1-dimethyl-2-vinyloxymethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl (meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(vinyloxyethoxy)ethyl(meth)acrylate, 2-(vinyloxyisopropoxy)ethyl (meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy) isopropyl(meth)acrylate, 2-(vinyloxyethoxyethoxy)ethyl (meth)acrylate, 2-(vinyloxyethoxyisopropoxy)ethyl(meth) acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isoprepenoxyethoxyethoxy)ethyl(meth)acrylate, 2-(isopropenoxyethoxyethoxyethoxy)ethyl(meth)acrylate, 2-(isopropenoxyethoxyethoxyethoxy)ethyl(meth)acrylate, polyethylene glycol monovinyl ether(meth)acrylate, polypropylene glycol monovinyl ether(meth)acrylate.

Among these, 2-(vinyloxyethoxy)ethyl(meth)acrylate, that is, at least one of 2-(vinyloxyethoxy)ethyl acrylate and 2-(vinyloxyethoxy)ethyl methacrylate is preferable and 2-(vinyloxyethoxy)ethyl acrylate is more preferable since the ink can have lower viscosity, a high flash point, and excellent curability. In particular, either of 2-(vinyloxyethoxy)ethyl acrylate and 2-(vinyloxyethoxy)ethyl methacrylate has a simple structure, thereby having a low molecular weight, therefore, it is possible to significantly decrease the ink viscosity. 2-(Vinyloxyethoxy)ethyl(meth) acrylate includes 2-(2-vinyloxyethoxy)ethyl(meth)acrylate and 2-(1-vinyloxyethoxy)ethyl(meth)acrylate, and 2-(vinyloxyethoxy)ethyl acrylate includes 2-(2-vinyloxyethoxy) ethyl acrylate and 2-(1-vinyloxyethoxy)ethyl acrylate. In addition, 2-(vinyloxyethoxy)ethyl acrylate is better in terms of curability when compared with 2-(vinyloxyethoxy)ethyl methacrylate.

The vinyl ether group-containing (meth)acrylic acid esters may be used either alone or as a combination of two or more types.

The content of the vinyl ether group-containing (meth) acrylic acid esters, particularly 2-(vinyloxyethoxy)ethyl (meth)acrylate, is preferably 20 to 90% by mass, more preferably 40 to 80% by mass, and even more preferably 50 to 75% by mass with respect to the total mass (100% by mass) of the ink. If the content is greater than or equal to the lower limit, it is possible to decrease the viscosity of the ink, and make curability of the ink more excellent. Meanwhile, if the content is less than or equal to the upper limit, it is possible to prevent the occurrence of curing wrinkles more effectively, and a more favorable storage stability of the ink can be maintained.

Preparation methods of the vinyl ether group-containing (meth)acrylic acid esters include, but are not limited to, a method of esterification of (meth)acrylic acid and a hydroxyl group-containing vinyl ether (Preparation Method B), a method of esterification of a (meth)acrylic acid halide and a hydroxyl group-containing vinyl ether (Preparation Method C), a method of esterification of a (meth)acrylic acid anhydride and a hydroxyl group-containing vinyl ether (Preparation Method D), a method of transesterification of (meth) acrylic acid esters and a hydroxyl group-containing vinyl ether (Preparation Method E), a method of esterification of (meth)acrylic acid and a halogen-containing vinyl ether (Preparation Method F), a method of esterification of an alkali (earth) metal salt of (meth)acrylic acid and a halogen-containing vinyl ether (Preparation Method G), a method of vinyl exchange of hydroxyl group-containing (meth)acrylic acid esters and vinyl carboxylate (Preparation Method H), and a method of ether exchange of hydroxyl group-containing (meth)acrylic acid esters and alkylvinyl ether (Preparation Method I).

Among these, Preparation Method E is preferable since it is possible to further exhibit the desired effects of this embodiment.

2. Monofunctional (Meth)acrylate

The ink of this embodiment also includes a monofunctional (meth)acrylate in addition to the vinyl ether group-containing (meth)acrylic acid esters. By the ink containing the monofunctional (meth)acrylate, the solubility of a photopolymerization initiator and other additives becomes excellent, and discharge stability at the time of ink jet recording can be easily obtained, and the viscosity of the ink becomes lower, and toughness, heat resistance, and chemical resistance of the coated film are increased as well.

Examples of the monofunctional (meth)acrylate include phenoxyethyl (meth)acrylate, isoamyl (meth)acrylate, stearyl (meth)acrylate, lauryl (meth)acrylate, octyl (meth) acrylate, decyl (meth)acrylate, isomyristyl (meth)acrylate, isostearyl (meth)acrylate, 2-ethylhexyl-diglycol(meth)acrylate, 2-hydroxybutyl(meth)acrylate, 4-hydroxybutyl(meth) acrylate, butoxyethyl(meth)acrylate, ethoxy diethylene glycol (meth)acrylate, methoxy diethylene glycol (meth) acrylate, methoxy polyethylene glycol (meth)acrylate, methoxy propylene glycol (meth)acrylate, tetrahydrofurfuryl (meth)acrylate, isobornyl (meth)acrylate, 2-hydroxyethyl(meth)acrylate, 2-hydroxypropyl(meth)acrylate, 2-hydroxy-3-phenoxypropyl(meth)acrylate, lactone-modified flexible (meth)acrylate, t-butylcyclohexyl(meth)acrylate, dicyclopentanyl (meth)acrylate, dicyclopentenyloxyethyl (meth)acrylate, benzyl (meth)acrylate, ethoxylated nonylphenyl (meth)acrylate, alkoxylated nonylphenyl (meth)acrylate, and p-cumylphenol EO modified (meth)acrylate.

Among the above, a monofunctional (meth)acrylate having an aromatic ring skeleton in the molecule is preferable since curability, storage stability, and solubility of a photopolymerization initiator are more excellent. Examples of the monofunctional (meth)acrylate having an aromatic ring skeleton preferably include, but are not limited to, phenoxyethyl (meth)acrylate, benzyl (meth)acrylate, 2-hydroxyphenoxypropyl(meth)acrylate and phenoxy diethylene glycol (meth)acrylate. Among these, at least any one of phenoxyethyl (meth)acrylate and benzyl (meth)acrylate is preferable, and phenoxyethyl (meth)acrylate is more preferable since the viscosity of the ink can be decreased, and curability, scratch resistance, adhesion and solubility of a photopolymerization initiator can be all excellent as well.

The monofunctional (meth)acrylate other than the vinyl ether group-containing (meth)acrylic acid esters may be used either alone or as a combination of two or more types.

The content of monofunctional (meth)acrylate other than the vinyl ether group-containing (meth)acrylic acid esters is preferably 10 to 50% by mass and more preferably 20 to 40% by mass with respect to the total mass (100% by mass) of the ink. If the content is greater than or equal to the lower limit, the solubility of a photopolymerization initiator as well as curability becomes more excellent. On the other hand, if the content is less than or equal to the upper limit, adhesion as well as curability becomes more excellent.

3. Polymerizable Compound Other than Above

The ink of this embodiment may further include a polymerizable compound other than the above (hereinafter, referred to as "other polymerizable compound"). As the other polymerizable compound, it is possible to use various monomers and oligomers such as monofunctional, difunctional, and polyfunctional such as trifunctional or higher ones known in the related art. Examples of the monomers include unsaturated carboxylic acids such as (meth)acrylic acid, itaconic acid, crotonic acid, isocrotonic acid and maleic acid or salts thereof, esters, urethanes, amides and anhydrides thereof, acrylonitriles, styrenes, various unsaturated polyesters, unsaturated polyethers, unsaturated polyamides and unsaturated urethanes. Examples of the oligomers include an oligomer formed from the monomers described above such as linear acrylic oligomers, epoxy (meth)acrylate, oxetane (meth)acrylate, aliphatic urethane (meth)acrylate, aromatic urethane (meth)acrylate, and polyester (meth)acrylate.

Among the other polymerizable compounds, difunctional or higher esters of (meth)acrylic acid, that is, difunctional or higher (meth)acrylates are preferable.

Examples of the difunctional (meth)acrylate include diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, EO (ethylene oxide) adduct of bisphenol A di(meth)acrylate, PO (propylene oxide) adduct of bisphenol A di(meth)acrylate, neopentyl glycol hydroxypivalate di(meth)acrylate and polytetramethylene glycol di(meth)acrylate.

Examples of the trifunctional or higher polyfunctional (meth)acrylate include trimethylolpropane tri(meth)acrylate, EO modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glyceryl propoxy tri(meth)acrylate, caprolactone-modified trimethylolpropane tri(meth)acrylate, pentaerythritolethoxy tetra(meth)acrylate and caprolactam-modified dipentaerythritol hexa(meth)acrylate.

The other polymerizable compound may be used either alone or as a combination of two or more types.

If the other polymerizable compound is included in the ink, the content is preferably 15% by mass or less, and more preferably 10% by mass or less with respect to the total mass (100% by mass) of the ink.

Furthermore, it is also possible to omit the addition of a photopolymerization initiator by using a photopolymerizable compound as a polymerizable compound, however, using a photopolymerization initiator is preferable in terms that initiation of the polymerization can be readily adjusted.

Photopolymerization Initiator

The ink of this embodiment may further include a photopolymerization initiator. The photopolymerization initiator is used to form printing by curing the ink present on the surface of the recording medium using photopolymerization by the irradiation of ultraviolet light. By using ultraviolet light (UV) among light types, excellence in safety can be obtained, and the costs of a light source lamp can be reduced. The photopolymerization initiator that can be used is not limited as long as it generates active species such as radicals or cations by the energy of ultraviolet light, and initiates polymerization of the polymerizable compound, however, a photo-radical polymerization initiator or a photo-cationic polymerization initiator may be used, and among these, a photo-radical polymerization initiator is preferable.

Examples of the photo-radical polymerization initiator include aromatic ketones, acylphosphine oxide compounds, aromatic onium salt compounds, organic peroxides, thio compounds (thioxanthone compounds, thiophenyl group-containing compounds, and the like), hexaarylbiimidazole compounds, ketoxime ester compounds, borate compounds, azinium compounds, metallocene compounds, active ester compounds, compounds having a carbon-halogen bond and alkylamine compounds.

Among these, acyl phosphine oxide compounds are preferable since, particularly, the curability of the ink can be more favorable.

Specific examples of the photo-radical polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone 2-chlorothioxanthone, 2-methyl-1-[4-(methylthio) phenyl]-2-morpholino-propan-1-one, bis(2,4,6-trimethylbenzoyl)-phenylphosphine oxide, 2,4,6-trimethylbenzoyldiphenylphosphine oxide, 2,4-diethylthioxanthone and bis-(2,6-dimethoxybenzoyl)-2,4,4-trimethylpentylphosphine oxide.

Examples of commercially available products of the photo-radical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methylpropionyl)-benzyl]phenyl]-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-1-butanone), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyldiphenylphosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1.2-octanedione, 1-[4-(phenylthio)-2-(O-benzoyloxime)]), IRGACURE OXE 02 (ethanone, 1-[9-ethyl-6-(2-methylbenzoyl)-9H-carbazol-3-yl]-1-(O-acetyloxime)), IRGACURE 754 (a mixture of 2-[2-oxo-2-phenylacetoxy-ethoxy]ethyl ester of oxyphenyl acetic acid, and 2-(2-hydroxyethoxy)ethyl ester of oxyphenyl acetic acid) (hereinbefore, trade name manufactured by BASF Corporation), KAYACURE DETX-S (2,4-diethylthioxanthone) (trade name manufactured by Nippon Kayaku Co., Ltd.), Speedcure TPO (2,4,6-trimethylbenzoyldiphenylphosphine oxide), Speedcure DETX (2,4-diethylthioxanthen-9-one) (hereinbefore, trade name manufactured by Lambson, Co. Ltd.), Lucirin TPO, LR8893, LR8970 (hereinbefore, trade name manufactured by BASF Corporation), Ebecryl P36 (trade name manufactured by UCB, Chemicals, Inc.), or the like.

The photopolymerization initiator may be used either alone or as a combination of two or more types. The content of the photopolymerization initiator is preferably 20% by mass or less with respect to the total mass (100% by mass)

of the ink in order to have excellent curability by improving the ultraviolet curing rate, and to avoid coloration derived from the photopolymerization initiator and the remaining melt of the photopolymerization initiator.

In particular, when the photopolymerization initiator includes an acylphosphine oxide compound, the content of the photopolymerization initiator is more preferably 5 to 15% by mass, and even more preferably 7 to 13% by mass with respect to the total mass (100% by mass) of the ink. If the content is greater than or equal to the lower limit of the above content, the curability is more excellent. More specifically, the curability is more excellent since sufficient curing rate can be obtained when curing using an LED particularly (preferable emission peak wavelength: 360 nm to 420 nm). Meanwhile, if the content is less than or equal to the upper limit, the solubility of the photopolymerization initiator is even more excellent.

Coloring Material

The ink of this embodiment may further include a coloring material. As the coloring material, at least any one of pigments and dyes can be used.

1. Pigment

By using a pigment as a coloring material, the light resistance of the ink can be improved. Any one of inorganic pigments and organic pigments can be used as the pigment.

As the inorganic pigments, carbon blacks (C.I. Pigment Black 7) such as furnace black, lamp black, acetylene black and channel black, iron oxide or titanium oxide can be used.

As the organic pigments, azo pigments such as insoluble azo pigments, condensed azo pigments, azo lake and chelate azo pigment, polycyclic pigments such as phthalocyanine pigments, perylene and perinone pigments, anthraquinone pigments, quinacridone pigments, dioxane pigments, thioindigo pigments, isoindolinone pigments and quinophthalone pigments, dye chelates (for example, basic dye-type chelates, acidic dye-type chelates, and the like), dye lakes (basic dye lakes and acidic dye lakes), nitro pigments, nitroso pigments, aniline black or daylight fluorescent pigments may be included.

More specifically, the carbon black used in the black ink includes No. 2300, No. 900, MCF88, No. 33, No. 40, No. 45, No. 52, MA7, MA8, MA100, No. 2200B and the like (hereinbefore, manufactured by Mitsubishi Chemical Corporation), Raven 5750, Raven 5250, Raven 5000, Raven 3500, Raven 1255, Raven 700 and the like (hereinbefore, manufactured by Colombian Chemicals Company (Carbon Columbia)), Regal 400R, Regal 330R, Regal 660R, Mogul L, Monarch 700, Monarch 800, Monarch 880, Monarch 900, Monarch 1000, Monarch 1100, Monarch 1300, Monarch 1400 (manufactured by CABOT JAPAN K.K.), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4 (hereinbefore, manufactured by Evonik Degussa GmbH), Microlith Black 0066K (manufactured by formerly Microlith Black C-K, BASF Corporation) and the like.

The pigment used in the white ink includes C.I. Pigment White 6, 18 and 21.

The pigment used in the yellow ink includes C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172 and 180.

The pigment used in the magenta ink includes C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224 and 245, or C.I. Pigment Violet 19, 23, 32, 33, 36, 38, 43 and 50.

The pigment used in the cyan ink includes C.I. Pigment Blue 1, 2, 3, 15, 15:1, 15:2, 15:3, 15:34, 15:4, 16, 18, 22, 25, 60, 65 and 66, or C.I. Vat Blue 4 and 60.

Examples of other pigments other than the magenta, cyan and yellow pigments include C.I. Pigment Green 7 and 10, C.I. Pigment Brown 3, 5, 25 and 26, or C.I. Pigment Orange 1, 2, 5, 7, 13, 14, 15, 16, 24, 34, 36, 38, 40, 43 and 63.

The pigments may be used either alone or as a combination of two or more types.

When using the pigment, an average particle diameter thereof is preferably 300 nm or less, and more preferably 50 to 200 nm. If the average particle diameter is within the above range, an image having excellent quality can be formed, and more excellent reliability such as discharge stability and dispersion stability in the ink can be obtained as well. Herein, the average particle diameter of this specification can be measured using a dynamic light scattering method.

2. Dye

Dyes can be used as the coloring material. It is possible to use acidic dyes, direct dyes, reactive dyes and basic dyes as the dyes without particular limitation. Examples of the dyes include C.I. Acid Yellow 17, 23, 42, 44, 79 and 142, C.I. Acid Red 52, 80, 82, 249, 254 and 289, C.I. Acid Blue 9, 45 and 249, C.I. Acid Black 1, 2, 24 and 94, C.I. Food Black 1 and 2, C.I. Direct Yellow 1, 12, 24, 33, 50, 55, 58, 86, 132, 142, 144 and 173, C.I. Direct Red 1, 4, 9, 80, 81, 225 and 227, C.I. Direct Blue 1, 2, 15, 71, 86, 87, 98, 165, 199 and 202, C.I. Direct Black 19, 38, 51, 71, 154, 168, 171 and 195, C.I. Reactive Red 14, 32, 55, 79 and 249, or C.I. Reactive Black 3, 4 and 35.

The dyes may be used either alone or as a combination of two or more types.

The content of the coloring material is preferably 1 to 20% by mass with respect to the total mass (100% by mass) of the ink since excellent concealing properties and color reproducibility can be obtained.

Dispersant

If the ink of this embodiment includes the pigment, it may also include a dispersant for more favorable pigment dispersion. Examples of the dispersant include, but are not limited to, dispersants commonly used for preparing a pigment dispersion liquid such as polymeric dispersants. Specific examples thereof include those having one or more types among polyoxyalkylene polyalkylene polyamine, vinyl-based polymers and copolymers, acrylic polymers and copolymers, polyesters, polyamides, polyimides, polyurethanes, amino-based polymers, silicon-containing polymers, sulfur-containing polymers, fluorine-containing polymers and epoxy resins as main components. Examples of commercially available products of the polymeric dispersant include AJISPER series (trade name) manufactured by Ajinomoto Fine-Techno Co., Inc., SOLSPERSE series (Solsperse 32000, 36000, and the like [hereinbefore, trade name]) available from Avecia Inc., DISPERBYK series (trade name) manufactured by BYK-Chemie GmbH, DISPARLON series (trade name) manufactured by Kusumoto Chemicals, Ltd.

The dispersant may be used either alone or as a combination of two or more types. In addition, the content of the dispersant is not particularly limited, and a preferable amount may be added as appropriate.

Polymerization Inhibitor

The ink of this embodiment may further include a polymerization inhibitor. By the ink containing a polymerization inhibitor, a polymerization reaction of the polymerizable compound prior to curing can be prevented.

The polymerization inhibitor is not particularly limited, however, examples thereof include phenol-based polymerization inhibitors. Examples of the phenol-based polymerization inhibitor include, but are not limited to, p-methoxyphenol, cresol, t-butyl catechol, di-t-butyl paracresol, hydroquinone monomethyl ether, α-naphthol, 3,5-di-t-butyl-4-hydroxytoluene, 2,6-di-t-butyl-4-methylphenol, 2,2'-methylene-bis(4-methyl-6-t-butylphenol), 2,2'-methylene-bis(4-ethyl-6-butylphenol) and 4,4'-thio-bis-(3-methyl-6-t-butylphenol).

Examples of commercially available products of the phenol-based polymerization inhibitor include p-methoxyphenol (trade name manufactured by Tokyo Chemical Industry Co. Ltd., p-methoxy phenol), NONFLEX MBP (trade name manufactured by Seiko Chemical Co. Ltd., 2,2'-methylene-bis(4-methyl-6-t-butylphenol)), and BHT SWANOX (trade name manufactured by Seiko Chemical Co. Ltd., 2,6-di-t-butyl-4-methylphenol).

The polymerization inhibitor may be used either alone or as a combination of two or more types. In addition, the content of the polymerization inhibitor is not particularly limited, and a preferable amount may be added as appropriate.

Surfactant

The ink of this embodiment may further include a surfactant. The surfactant is not particularly limited, however, for example, polyester-modified silicone or polyether-modified silicone can be used as a silicone-based surfactant, and using polyether-modified polydimethylsiloxane or polyester-modified polydimethylsiloxane is particularly preferable.

Commercially available products of the surfactant include BYK-347, BYK-348, BYK-UV3500, 3510, 3530, 3570 (hereinbefore, manufactured by BYK-Chemie GmbH).

The surfactant may be used either alone or as a combination of two or more types. In addition, the content of the surfactant is not particularly limited, and a preferable amount may be added as appropriate.

Other Additives

The ink of this embodiment may include additives (components) other than the additives described above. Such components are not particularly limited, however, examples thereof include a polymerization accelerator, a penetration enhancer, a wetting agent (a moistener), and other additives known in the related art. Examples of the other additives described above include a fixing agent, a mold proof agent, an antiseptic agent, an antioxidant, a ultraviolet absorber, a chelating agent, a pH adjusting agent and a viscosity agent known in the related art.

Thus, according to this embodiment, a ultraviolet curable ink having excellent storage stability, which is used in an ink jet recording method in which curability, suppression of curing wrinkles, filling properties of a solid pattern image, and a line width (main scanning direction and sub-scanning direction) are all excellent can be provided.

Hereinafter, a second embodiment for implementing the invention will be described in detail. In addition, the details described above in the first embodiment can be applied to the second embodiment, except for the details described below. Furthermore, among the details of the second embodiment described below, the details that can be applied to the first embodiment described above may be applied to the first embodiment.

Ink Jet Recording Method

One embodiment of the invention relates to an ink jet recording method. The ink jet recording method includes a discharging step for discharging a ultraviolet curable ink having predetermined properties from a head toward a recording medium, and a curing step for curing the ultraviolet curable ink adhered to the recording medium. In addition, the ink jet recording method of the invention may be an ink jet recording method performed by using an ink jet recording apparatus of this embodiment described above or below.

Discharging Step

A discharging step in this embodiment is for discharging a predetermined ultraviolet curable ink from a head toward a recording medium (hereinafter simply referred to as "ink"). The viscosity of the ink at 20° C. is 7 mPa·s or more. In addition, the temperature of the ultraviolet curable ink discharged is 20 to 30° C., and the viscosity of the ultraviolet curable ink discharged is 13 mPa·s or less. Furthermore, the viscosity of the ink at the discharging temperature may be 13 mPa·s or less, and the viscosity of the ink at 20° C. may or may not be 13 mPa·s or less.

The temperature of 20 to 30° C. described above corresponds to room temperature or near room temperature. Thus, if the temperature of the ink discharged is room temperature or near room temperature, the costs can be kept low since there is no need for temperature control such as providing a heating mechanism in a recording apparatus, and an advantageous effect such as discharge stability becoming favorable due to little variation in the temperature is obtained.

Furthermore, when the viscosity is 7 mPa·s or more at 20° C., the occurrence of curing wrinkles can be prevented. It is postulated that, in the film coating of the ink, curing wrinkles occur, when the inside of the coated film is cured later than the surface of the coated film after the surface of the coated film is cured, by the surface of the coated film cured earlier being deformed, or the ink inside the cured film irregularly flowing before being cured. Furthermore, it is postulated that a ultraviolet curable ink having low viscosity shows a tendency to have a large polymerization shrinkage associated with curing (the difference between the volume of the ink and the volume of the ink (cured product) after curing with respect to the volume of the ink before curing having a predetermined mass), and therefore, the occurrence of curing wrinkles is significant. In addition, when the viscosity of the ink at the temperature of the ink discharged is 13 mPa·s or less, filling properties becomes excellent. It is postulated that the reason for these excellent filling properties is that the increase in viscosity due to temperature decrease, which may happen after discharge when the ink is heated can be prevented since the viscosity of the ink is low even without heating. In this way, in the recording method of this embodiment, the ultraviolet curable ink can be discharged without heating, therefore, advantageous effects can be obtained such that it is not necessary to provide a mechanism for heating in a recording apparatus using the recording method. However, the recording apparatus being provided with a heating mechanism is not excluded in any way. In addition, this embodiment is not limited in any way to the above postulations.

In addition, in order to further heighten the advantageous effects described above, the temperature of the ultraviolet curable ink discharged is preferably 23 to 28° C., and the viscosity of the ink at the temperature of the ink discharged is preferably 11 mPa·s or less. The viscosity of the ink at 20° C. is preferably 9 mPa·s or more.

In addition, in the ultraviolet curable ink, viscosity variation due to temperature variation at the time of discharge is large since the ultraviolet curable ink has higher viscosity than an aqueous ink used in ordinary ink jet inks. Such viscosity variation has large effects on the changes in droplet sizes and changes in droplet discharging rate, and consequently can cause image degradation. Therefore, it is preferable that the temperature of the ink discharged be kept constant as much as possible. Heating is not necessary in the ultraviolet curable ink of this embodiment since the temperature of the ink discharged is room temperature or near room temperature, and the temperature of the ink to be discharged can be maintained approximately constant. Therefore, the ultraviolet curable ink in this embodiment has excellent image quality.

Curing Step

The curing step is for curing the ultraviolet curable ink adhered to the recording medium by irradiating with ultraviolet light (light) from a light source. The curing step of the first embodiment described above can be used as the curing step, but in the second embodiment, the curing step includes at least a curing step performed by irradiation having a peak intensity (peak intensity of irradiation) of 800 mW/cm$^2$ or more from a light emitting diode having an emission peak wavelength in the range of 360 to 420 nm.

In addition, the peak intensity (peak intensity of irradiation) of ultraviolet light irradiated from a light source having an emission peak wavelength within the above range is preferably 1,000 mW/cm$^2$ or more. If the peak intensity of irradiation is within the above range, curability is more excellent, and the occurrence of curing wrinkles is more effectively prevented. More particularly, as a result of delayed curing of the inside of the coating ink compared to the curing of the surface, the surface of the coating ink is cured first, and the occurrence of curing wrinkles is effectively prevented.

In addition, the value measured using a ultraviolet intensity meter UM-10 and a light receiving unit UM-400 (both manufactured by Konica Minolta Sensing, Inc.) can be employed as the peak intensity of irradiation in this specification.

Furthermore, the ultraviolet curable ink that can be cured by irradiation energy of preferably 600 mJ/cm$^2$ or less, more preferably 500 mJ/cm$^2$ or less, and even more preferably 200 to 500 mJ/cm$^2$ from a light source having an emission peak wavelength in the above range can be used in the recording method of this embodiment. In addition, it is preferable that irradiation energy be set in the above range. In this case, low cost printing and a high printing speed can be achieved along with the likely increase of the output of an LED. Herein, when the irradiation is carried out a plurality of times, the irradiation energy is the total irradiation energy that is a sum of each irradiation energy. Furthermore, when irradiation is carried out a plurality of times, at least any one of the curing steps has only to include a curing step performed by irradiation having a peak intensity (peak intensity of irradiation) of 800 mW/cm$^2$ or more from a light emitting diode having an emission peak wavelength in the range of 360 to 420 nm.

Ink Jet Recording Apparatus

One embodiment of the invention relates to an ink jet recording apparatus, that is an ink jet printer. The recording apparatus can use the ink jet recording method of the above embodiment. The recording apparatus described above can be used as the recording apparatus (printer) for carrying out the recording method. The recording apparatus performs the curing step with respect to the ink adhered to the recording medium with at least one light source being provided, however, it is preferable that the recording apparatus be provided with a light source arranged in the main scanning direction of the head, and a light source disposed further downstream in the sub-scanning direction than the head in terms that it is possible to perform a curing step included in the main scanning, and a further curing step after the main scanning. A light source disposed further downstream in the sub-scanning direction than the head may be disposed in the recording apparatus separately from the carriage mounted with the head, however, it is preferable that a light source be mounted on the carriage mounted with the head in terms that the curing step can be performed by moving the carriage in the main scanning direction. In this case, the light source arranged in the main scanning direction of the head and the light source disposed further downstream in the sub-scanning direction than the head may be integrated.

When irradiation on the ink (curing step) is carried out a plurality of times, at least any one of the curing steps includes a curing step performed by irradiation having a peak intensity (peak intensity of irradiation) of 800 mW/cm$^2$ or more from a light emitting diode having an emission peak wavelength in the range of 360 to 420 nm. The peak intensity of irradiation is preferably 1,000 mW/cm$^2$ or more, and is preferably 2,000 mW/cm$^2$ or less, although the upper limit is not limited. If the peak intensity of irradiation is in the above range, reduction of curing wrinkles becomes excellent. Furthermore, irradiation energy of the curing step (the sum when the curing step is performed a plurality of times) performed by irradiation having a peak intensity (peak intensity of irradiation) of 800 mW/cm$^2$ or more from a light emitting diode having an emission peak wavelength in the range of 360 to 420 nm is preferably 600 mJ/cm$^2$ or less, and more preferably 500 mJ/cm$^2$ or less. The lower limit is preferably 100 mJ/cm$^2$ or more, and more preferably 200 mJ/cm$^2$ or more in terms of sufficient curing.

Among these, it is preferable that the curing step performed after the curing step included in the main scanning by the light source disposed further downstream in the sub-scanning direction than the head include a curing step performed by irradiation having a peak intensity (peak intensity of irradiation) of 800 mW/cm$^2$ or more from a light emitting diode having an emission peak wavelength in the range of 360 to 420 nm. The reason is that the higher the peak intensity, the greater the irradiation energy when irradiation time is constant, and increasing the irradiation energy of the final curing step performed later can ensure sufficient curing of the ink.

Meanwhile, the curing step included in the main scanning may include a curing step performed by irradiation having a peak intensity (peak intensity of irradiation) of 800 mW/cm$^2$ or more from a light emitting diode having an emission peak wavelength in the range of 360 to 420 nm, however, including a curing step performed by irradiation having a peak intensity (peak intensity of irradiation) of less than 800 mW/cm$^2$ from a light emitting diode having an emission peak wavelength in the range of 360 to 420 nm is preferable in terms that it can reduce uneven luster of the recorded image and power consumption of the light source arranged in the main scanning direction of the head. In the curing step included in the main scanning, the peak intensity (peak intensity of irradiation) is preferably 500 mW/cm$^2$ or less, more preferably 50 to 500 mW/cm$^2$, and even more preferably 200 to 500 mW/cm$^2$. In addition, the irradiation energy of the curing step included in the main scanning is preferably 500 mJ/cm$^2$ or less, more preferably 10 to 500 mJ/cm$^2$, even more preferably 10 to 200 mJ/cm$^2$, and even more preferably 10 to 100 mJ/cm$^2$. In addition, the sum of the irradiation energy of all the curing steps is preferably 600 mJ/cm$^2$ or less, and more preferably 500 mJ/cm$^2$ or less, and the lower limit is preferably 100 mJ/cm$^2$ or more, and more preferably 200 mJ/cm$^2$ or more in terms of sufficient curing.

When performing a curing step a plurality of times, the curing step included in the main scanning is the first curing step after the discharging step, and the curing step after the curing step included in the main scan is a curing step after the first curing step. The ink jet recording method of this embodiment may also be performed using a line printer. In case of a line printer, a light source may be disposed at a downstream side in the recording medium transport direction of the head in the direction of recording width of the recording medium with a length greater than the recording width. There may be a plurality of light sources disposed, and in this case, the curing step by the light source closest to the head is the first curing step after the discharging step, and the curing step after is a curing step after the first curing step.

It is preferable that the ink jet recording apparatus of this embodiment perform recording using overlap printing described above in terms of a line width, and suppression of curing wrinkles. The overlap printing described above can be considered as a recording method in which, when a unit region that forms dots is employed as a pixel, and an array of pixels arranged in a main scanning direction is employed as a raster line, there is a raster line including pixels intended to form a dot by another main scanning in between raster lines including pixels intended to form a dot by one main scanning in a sub-scanning direction, and a plurality of raster lines arranged in the sub-scanning direction includes a raster line made of pixels intended to form a dot by a certain main scanning, and pixels intending not to form a dot by a certain main scanning and form a dot by another round of main scanning. Herein, intended to form a dot in certain pixels by a certain main scanning refers to forming dots in certain pixels by a certain main scanning when pixel data are the data that form dots in certain pixels corresponding to the image to be recorded. Whether or not dots are actually formed in the pixels intended to form a dot depends on the image data corresponding to certain pixels in, but, if the areas having an image is an image area of high concentration, the image data becomes data that form dots in almost all the pixels in the region, therefore, in such a region, being intended to form a dot in certain pixels by a certain main scanning is forming dots in certain pixels by a certain main scanning, and both are essentially the same.

Ultraviolet Curable Ink

Furthermore, one embodiment of the invention relates to a ultraviolet curable ink. The ultraviolet curable ink can be used in the ink jet recording method and the ink jet recording apparatus of the above embodiment. As described above, in the ultraviolet curable ink, the viscosity at 20° C., the temperature at the time of discharge, and the viscosity at the corresponding temperature are in a predetermined range. The ink having the viscosity in a predetermined range can be designed by a calculation from the viscosity and the mass ratio (content ratio) of each single polymerizable compound as described above.

Hereinafter, additives (components) that are included or may be included as desired in the ultraviolet curable ink (hereinafter, simply referred to as "ink") of this embodiment will be described.

Polymerizable Compound

The ultraviolet curable ink of this embodiment includes a polymerizable compound. Among the polymerizable compounds, including 40 to 80% by mass of the above-described monofunctional (meth)acrylate is preferable, and including 50 to 70% by mass is more preferable with respect to the total mass of the ink in terms of curability, decreasing viscosity and reducing curing wrinkles. Herein, the ink of this embodiment may not include the above-described vinyl ether group-containing (meth)acrylic acid esters, and when it does, content thereof is included in the content of the above-described monofunctional (meth)acrylate.

Furthermore, if the ink includes the vinyl ether group-containing (meth)acrylic acid esters, the content is preferably 20 to 90% by mass, more preferably 40 to 80% by mass, and even more preferably 50 to 75% by mass with respect to the total mass (100% by mass) of the ink. If the content is within the above range, decreasing the viscosity of the ink, and curability of the ink can be more favorable. In addition, the ink of this embodiment may include difunctional or higher (meth)acrylates, and content thereof is preferably 5 to 45% by mass, and more preferably 10 to 40% by mass with respect to the total mass of the ink in terms curability, storage stability and decreasing viscosity of the ink.

The types of polymerizable compound used may be the same as those in the first embodiment described above, however, among these, phenoxyethyl (meth)acrylate, isobornyl (meth)acrylate, benzyl (meth)acrylate, 2-(2-vinyloxyethoxy)ethyl(meth)acrylate, 2-hydroxybutyl(meth)acrylate, 4-hydroxybutyl(meth)acrylate, tetrahydrofurfuryl (meth)acrylate or dicyclopentenyloxyethyl (meth)acrylate is preferable as a monofunctional (meth)acrylate. Dipropylene glycol di(meth)acrylate, diethylene glycol di(meth)acrylate, tripropylene glycol di(meth)acrylate, triethylene glycol di(meth)acrylate, or trifunctional or higher (meth)acrylates having a pentaerythritol skeleton or a dipentaerythritol skeleton is preferable as a polyfunctional (meth)acrylate. For the components other than the polymerizable compound, the same components as those used in the ink of the first embodiment described above can be used.

In addition, in this specification, the ultraviolet curable ink used in the ink jet recording method of this embodiment is a ultraviolet curable ink sold for an ink jet recording apparatus that performs recording using the ink jet recording method of this embodiment, and the ultraviolet curable ink used in the ink jet recording apparatus of this embodiment is a ultraviolet curable ink sold for the ink jet recording apparatus of this embodiment.

EXAMPLES

Examples of First Embodiment

Hereinafter, the first embodiment will be described in detail using examples and comparative examples, however, the invention is not limited to these examples.

Materials Used

Materials used in the examples and the comparative examples are as follows.

Polymerizable Compound

VEEA (2-(2-vinyloxyethoxy)ethyl acrylate, trade name manufactured by Nippon Shokubai Co., Ltd., monofunctional (meth)acrylate, and hereinafter described as "VEEA".)

Viscoat #192 (phenoxyethyl acrylate, trade name manufactured by Osaka Organic Chemical Industry Ltd., monofunctional (meth)acrylate, and hereinafter described as "PEA".)

V #160 (benzyl acrylate, trade name manufactured by Osaka Organic Chemical Industry Ltd., monofunctional (meth)acrylate, and hereinafter described as "BZA".)

IBXA (isobornyl acrylate, trade name manufactured by Osaka Organic Chemical Industry Ltd., monofunctional (meth)acrylate, and hereinafter described as "IBX".)

SR508 (dipropylene glycol diacrylate, difunctional (meth)acrylate, trade name manufactured by Sartomer Company Inc.)

A-DPH (dipentaerythritol hexaacrylate, hexafunctional (meth)acrylate, trade name manufactured by Shin-Nakamura Chemical Co., Ltd., and hereinafter described as "A-DPH".)

Polymer

Viscoat #1000 (manufactured by Osaka Organic Chemical Industry Ltd., a hyperbranched polymer, viscosity 273 mPa·s, number of acrylic groups 14, and hereinafter described as "V#1000".)

In addition, Viscoat #1000 is a hyperbranched polymer in which functional groups are branched from dipentaerythritol as a core, and contains ethylene glycol diacrylate as a diluent monomer.

Photopolymerization Initiator

IRGACURE 819 (trade name manufactured by BASF Corporation, solid content 100%, and hereinafter described as "819".)

DAROCUR TPO (trade name manufactured by Lambson, Co. Ltd., and hereinafter described as "TPO".)

Surfactant

BYK-UV3500 (polyether-modified polydimethylsiloxane, manufactured by BYK-Chemie GmbH, and hereinafter described as "BYK3500")

Coloring Material

C.I. Pigment Black 7 (manufactured by Mitsubishi Chemical Corporation, Mitsubishi Carbon MA11, and hereinafter described as "PB-7".)

Dispersant

Solsperse 32000 (trade name manufactured by Avecia Inc., and hereinafter described as "SOL32000".)

Polymerization Inhibitor p-Methoxyphenol (trade name manufactured by Tokyo Chemical Industry Co., Ltd., p-methoxyphenol, and hereinafter described as "MEHQ".)

Preparation of Ultraviolet Curable Inks 1 to 9

Ultraviolet Curable Inks 1 to 9 were obtained by adding each of the materials shown in Table 1 so that contents thereof (unit: % by mass) were those shown in Table 1, and stirring the mixture using a high-speed water-cooled stirrer.

Measurement and Evaluation Items

1. Rank of Ink Viscosity at 20° C.

The viscosity of each ink prepared as above was measured at 20° C. using a DVM-E type rotary viscometer (manufactured by Tokyo Keiki Inc.). A cone for a DVM-E type having a cone angle of 1° 34' and a cone radius of 2.4 cm was used as a rotor. A rotation speed was set to 10 rpm. The evaluation criteria were as follows. The evaluation results are shown in Table 1 below.

1: Less than 7 mPa·s.
2: Greater than or equal to 7 mPa·s and less than or equal to 13 mPa·s.
3: Greater than 13 mPa·s.

2. Evaluation of Storage Stability of Ink

Each of the inks prepared as above was placed in a 50 cc glass vial, and after sealing, these glass vials were placed in a thermostatic chamber at 60° C. and were allowed to stand for 7 days. After taking out the vials after 7 days, and returning the vials to room temperature sufficiently, the viscosity at 20° C. was measured in the same manner as that in the "Rank of Ink Viscosity at 20° C.". Then the viscosity increase ratio of the viscosity after standing for 7 days was calculated with respect to the initial (immediately after preparation) viscosity.

The evaluation criteria were as follows. The evaluation results are shown in Table 1 below.

A: +5% or less.
B: Greater than +5%.

3. Evaluation of Ink Curability

Each of the above inks was applied on Lumirror #125-E20 (trade name manufactured by Toray Industries Inc., PET film) using a bar coater manufactured by Tester Sangyo Co., Ltd. The thickness of the film after the curing of the coated film was 10 μm. Next, the ink coated film cured by irradiating with ultraviolet light having illuminance of 1,000 mW/cm$^2$ from an LED (Firefly [trade name], manufactured by Phoseon Technology) having a peak wavelength of 395 nm on the ink applied for a predetermined time was obtained. After the irradiation, the surface of the above ink coated film was rubbed back and forth 20 times using a cotton swab manufactured by Johnson & Johnson K.K under the conditions of a load of 130 g, and irradiation energy required until no scratch mark showed was measured.

The evaluation criteria were as follows. The evaluation results are shown in Table 1 below.

A: 200 mJ/cm$^2$ or less.
B: Greater than 200 mJ/cm$^2$ and less than or equal to 300 mJ/cm$^2$.
C: Greater than 300 mJ/cm$^2$.

TABLE 1

Ultraviolet Curable Inks 1 to 9

| Component Name | Name | No. of Ultraviolet Curable Ink | | | | | | | | |
|---|---|---|---|---|---|---|---|---|---|---|
| | | 1 | 2 | 3 | 4 | 5 | 6 | 7 | 8 | 9 |
| Polymerizable Compound | VEEA(1) | 50.0 | 20.0 | 87.7 | 77.7 | 82.7 | — | 42.7 | 60.0 | 55.0 |
| | PEA(1) | 30.0 | 30.0 | — | — | 5.0 | 42.7 | — | — | 15.0 |
| | BZA(1) | — | — | — | — | — | — | — | 20.0 | — |
| | IBX(1) | — | — | — | — | — | — | — | — | 10.0 |
| | SR508(2) | — | 30.0 | — | — | — | 45.0 | 45.0 | — | — |
| | A-DPH(6) | 7.7 | 7.7 | — | — | — | — | — | 7.7 | 7.7 |
| Polymer | V#1000 | — | — | — | 10.0 | — | — | — | — | — |
| Photopolymerization Initiator | 819 | 4.0 | 4.0 | 4.0 | 4.0 | 4.0 | 4.0 | 4.0 | 4.0 | 4.0 |
| | TPO | 5.0 | 5.0 | 5.0 | 5.0 | 5.0 | 5.0 | 5.0 | 5.0 | 5.0 |
| Surfactant | BYK 3500 | 0.2 | 0.2 | 0.2 | 0.2 | 0.2 | 0.2 | 0.2 | 0.2 | 0.2 |
| Coloring Material | PB-7 | 2.0 | 2.0 | 2.0 | 2.0 | 2.0 | 2.0 | 2.0 | 2.0 | 2.0 |

TABLE 1-continued

Ultraviolet Curable Inks 1 to 9

| Component Name | Name | No. of Ultraviolet Curable Ink | | | | | | | | |
|---|---|---|---|---|---|---|---|---|---|---|
| | | 1 | 2 | 3 | 4 | 5 | 6 | 7 | 8 | 9 |
| Dispersant | SOL 32000 | 1.0 | 1.0 | 1.0 | 1.0 | 1.0 | 1.0 | 1.0 | 1.0 | 1.0 |
| Polymerization Inhibitor | MEHQ | 0.1 | 0.1 | 0.1 | 0.1 | 0.1 | 0.1 | 0.1 | 0.1 | 0.1 |
| Total | | 100.0 | 100.0 | 100.0 | 100.0 | 100.0 | 100.0 | 100.0 | 100.0 | 100.0 |
| Rank of Ink Viscosity at 20° C. | | 2 | 3 | 1 | 2 | 1 | 2 | 2 | 2 | 2 |
| Storage Stability | | A | A | B | B | A | A | B | A | A |
| Curability | | A | A | A | C | A | C | C | A | B |

In addition, in Table 1, the numbers of each polymerizable compound in parentheses represent the number of functional groups of the (meth)acrylate. In addition, Ultraviolet Curable Inks 1, 8 and 9 correspond to the inks that can be used in examples, and Ultraviolet Curable Inks 2 to 7 correspond to the inks used in comparative examples.

In Table 1, it was found that the ultraviolet curable inks (No. 1, 2, 8 and 9) that contain vinyl ether group-containing (meth)acrylic acid esters represented by General Formula (I), and a monofunctional (meth)acrylate other than the vinyl ether group-containing (meth)acrylic acid esters, and also, have the viscosity of 7 mPa·s or more at 20° C. were excellent in both storage stability and curability of the ink when compared to otherwise ultraviolet curable inks.

In detail, first, the curability of the ultraviolet curable ink becomes excellent by the ultraviolet curable ink including vinyl ether group-containing (meth)acrylic acid esters. In addition, at least the storage stability becomes excellent, and furthermore, the curability may become excellent as well by the ultraviolet curable ink including a monofunctional (meth)acrylate other than the vinyl ether group-containing (meth)acrylic acid esters. Furthermore, the viscosity of the ultraviolet curable ink at 20° C. being 7 mPa·s or more can effectively prevent the occurrence of curing wrinkles as described below. Then, the viscosity of the ultraviolet curable ink at the discharging temperature being 13 mPa·s or less can especially make the line width excellent (filling properties of line width to be more specific) as described below. In addition, when comparing Ultraviolet Curable Inks 1, 8 and 9 with each other, the curability of the ink becomes more excellent when using PEA or BZA as a monofunctional (meth)acrylate other than the vinyl ether group-containing (meth)acrylic acid esters compared to when using IBX. Hereinafter, recording methods in each of the examples and comparative examples will be described.

Recording Method 1: Examples 1 to 3, 7 and 8, and Comparative Examples 1 to 8

A serial printer shown in FIGURE was used. More specifically, using an ink jet printer PX-G5000 (manufactured by Seiko Epson Corporation), a light source (UV-LED) described below was installed further downstream in the sub-scanning direction than a carriage and a platen of this printer. In addition, a heater capable of heating the ink was installed in the head so that the temperature of the ink at the time of discharge could be adjusted. The head was filled with one of each ink composition. Printing was performed by carrying out main scanning while the ink was discharged from the head on a white PET film (Lumirror 125E20 manufactured by Toray Industries Inc.) that was the recording medium. The nozzle density in the sub-scanning direction of the nozzle array used for printing was set to 360 dpi.

When carrying out the main scanning, the ultraviolet curable ink landed and adhered on the recording medium by the main scanning was preliminarily cured per one path (one-time main scanning), using an LED having a peak wavelength of 395 nm, which was mounted on the side of the carriage (irradiation was carried out on the dots). At this time, Firefly (peak intensity of irradiation 1,000 mW/cm$^2$) was used as the LED mounted on the side of the carriage. In addition, irradiation energy in the irradiation of one path was set to 100 mJ/cm$^2$.

Next, the main scanning and the sub-scanning were alternately repeated by performing the following main scanning after performing a sub-scanning that transported the recording medium in the sub-scanning direction intersecting with the main scanning direction.

After the completion of the printing (after completion of the last main scanning), uncured ink was cured completely by further irradiating the ultraviolet curable ink from the light source (the same type as those mounted on the carriage) corresponding to the width of the recording medium provided separately with the carriage on the recording medium transported more downstream in the sub-scanning direction than the platen. The irradiation energy of the curing was 400 mJ/cm$^2$. Elaborating on the recording conditions (printing conditions), the number of paths (number of main scannings) was set to "two paths (main scanning direction)×two paths (sub-scanning direction)=four paths". In detail, overlap printing that forms dots on every other pixel of the first raster line in one path was performed so that there was one raster line that forms dots by another main scanning in between two raster lines that form dots in one-time main scanning. The distance between the nozzle surface and the recording surface of the recording medium was set to 1 mm. In addition, the recording resolution (sub-scanning direction×main scanning direction) was set to 720 dpi×720 dpi.

Furthermore, the temperature of the ink at the time of discharge was as shown in the following Table 2 and Table 3, respectively. The temperature was a value obtained by measuring the temperature of a nozzle plate having the nozzle plate provided with a thermocouple. In other words, the temperature of the ink to be discharged from the nozzle of the head corresponds to the temperature of the nozzle plate (hereinafter the same). Furthermore, in the example in which the ink temperature at the time of discharge was 35° C. among the temperatures listed in Tables 2 and 3, the ink at the time of discharge was heated to 35° C. using a temperature adjustment mechanism (heater) mounted on the head. In addition, in the examples in which the temperature of the ink at the time of ink was other than 35° C., the printing was performed at room temperature without the use of a temperature control mechanism so that the temperature remained at room temperature. In each example, the discharging amount was made to be the same between each example and each comparative example by adjusting the voltage of a head-driving waveform.

Recording Method 2: Example 4, and Comparative Examples 9 and 10

Recording was carried out in the same manner as that of Recording Method 1 except that the number of paths was changed to "one path (main scanning direction)×two paths (sub-scanning direction)=two paths". In other words, Recording Method 2 was different from Recording Method 1, overlap printing was not performed since one path was made to be in the main scanning direction, and dots were formed on all the pixels of one raster line in one path. In addition, regarding the heating by the temperature control mechanism carried out in Comparative Example 9, heating was carried out in the same manner as that of Comparative Examples 3 and 9 and using Recording Method 1. Recording Method 3: Example 5, and Comparative Examples 11 and 12

Recording was carried out in the same manner as that of Recording Method 1 except that the distance between the nozzle surface and the recording surface of the recording medium was changed to 10 mm. In addition, regarding the heating by temperature control mechanism carried out in Comparative Example 11, heating was carried out in the same manner as that of Comparative Examples 3 and 9 and using Recording Method 1.

Recording Method 4: Example 6, and Comparative Examples 13 and 14

Recording was carried out in the same manner as that of Recording Method 1 except the following. Recording was carried out in one path (single path) using a line printer equipped with a line head corresponding to the width of the recording medium disclosed in FIG. 2 of JPA-2011-184610. In addition, the nozzle density of the line head was set to 720 dpi. Herein, the transport direction of the recording medium is the main scanning direction. The same light source with the light source provided further downstream in the sub-scanning direction than the platen using Recording Method 1 was provided more downstream in the transport direction than the line head, and irradiation was performed using the corresponding light source. In addition, regarding the heating by temperature control mechanism carried out in Comparative Example 13, heating was carried out in the same manner as that of Comparative Examples 3 and 9 and using Recording Method 1.

Measurement and Evaluation Items
1. Rank of Ink Viscosity at Time of Discharge

The viscosity of each ink was measured in the same manner as the rank of ink viscosity at 20° C. described above except that the temperature during the viscosity measurements was set to the ink temperature at the time of discharge listed in Tables 2 and 3. In addition, the evaluation criteria were the same as the criteria of the rank of ink viscosity at 20° C. described above.

2. Evaluation of Filling Properties of Solid Pattern Image

A solid pattern image having a recording resolution of 720 dpi×720 dpi and a dimension (size) of 20 cm×20 cm was recorded by forming and curing dots of 11 ng/pixel in each pixel on the recording medium. The pixel is a minimum recording unit area defined by recording resolution. Then, whether or not the recording surface not hidden by the dots in the area of the solid pattern image was visible was evaluated visually at a distance of 30 cm from the recording medium. In addition, the "solid pattern image" means, typically, an image pattern that should have an image in which the recording surface is not seen since the recording area of the recording medium is covered with ink by dots being recorded for all the pixels in the pixels that are a minimum recording unit area defined by recording resolution. The evaluation criteria were as follows. The evaluation results are shown in Table 2 and Table 3 below.

A: The recording surface was not seen.
B: The recording surface was seen.

3. Evaluation of Line Width

The line width was measured by forming dots of 11 ng/pixel in each pixel of one pixel array arranged in the sub-scanning direction and the main scanning direction, and recording a line made of dot arrays. Measurement and evaluation of the line width was separated into the case of recording dot arrays in the sub-scanning direction, and the case of recording dot arrays in the main scanning direction. The evaluation criteria were as follows. The evaluation results are shown in Table 2 and Table 3 below. In the table, "line width, sub-scanning direction" means a line width when recording a dot array in the sub-scanning direction, and "line width, main scanning direction" means a line width when recording a dot array in the main scanning direction.

A: 110 μm or more
B: Greater than or equal to 80 μm and less than 110 μm
C: Greater than or equal to 50 μm and less than 80 μm
D: Less than 50 μm 4. Evaluation of Curing wrinkles Each solid image pattern obtained in "2. Evaluation of Filling Properties of Solid Pattern Image" was used. The root mean square height (Rq value) of each solid pattern image was measured using a laser microscope VK-9700 (manufactured by Keyence Corporation). In addition, the surface of each solid pattern image was observed visually. The evaluation criteria were as follows. The evaluation results are shown in Table 2 and Table 3 below.

A: Rq was 4 or less. Luster was seen on the surface of the solid pattern image.
B: Rq was greater than 4 and less than or equal to 6. A slight luster was seen on the surface of the solid pattern image.
C: Rq was greater than 6. No luster was seen on the surface of the solid pattern image.

TABLE 2

Examples 1 to 8, and Comparative Examples 1 to 4

| | | | | | | No. of Examples | | | | | | |
|---|---|---|---|---|---|---|---|---|---|---|---|---|
| | Example | | | | | | | | Comparative Example | | | |
| Item | 1 | 2 | 3 | 4 | 5 | 6 | 7 | 8 | 1 | 2 | 3 | 4 |
| No. of Ink Used | 1 | 8 | 9 | 1 | 1 | 1 | 1 | 1 | 3 | 2 | 2 | 3 |
| Temperature of Ink at Time of Discharge | 25° C. | 25° C. | 25° C. | 25° C. | 25° C. | 25° C. | 30° C. | 20° C. | 35° C. | 30° C. | 35° C. | 25° C. |
| Rank of Ink Viscosity at Time of Discharge | 2 | 2 | 2 | 2 | 2 | 2 | 2 | 2 | 1 | 3 | 2 | 1 |
| No. of Recording Method | 1 | 1 | 1 | 2 | 3 | 4 | 1 | 1 | 1 | 1 | 1 | 1 |
| Filling Properties (Solid Pattern) | A | A | A | A | A | A | A | A | A | — | B | A |
| Line Width (Sub-scanning Direction) | A | A | A | A | A | B | A | A | A | — | C | A |
| Line Width (Main Scanning Direction) | A | A | A | B | A | B | A | A | A | — | C | A |
| Curing wrinkles | A | A | A | B | A | B | A | A | C | — | A | C |

TABLE 3

Comparative Examples 5 to 14

| | | | | | No. of Examples | | | | | |
|---|---|---|---|---|---|---|---|---|---|---|
| Item | 5 | 6 | 7 | 8 | 9 | 10 | 11 | 12 | 13 | 14 |
| No. of Ink Used | 4 | 5 | 6 | 7 | 2 | 3 | 2 | 3 | 2 | 3 |
| Temperature of Ink at Time of Discharge | 25° C. | 25° C. | 25° C. | 25° C. | 35° C. | 25° C. | 35° C. | 25° C. | 35° C. | 25° C. |
| Rank of Ink Viscosity at Time of Discharge | 2 | 1 | 2 | 2 | 2 | 1 | 2 | 1 | 2 | 1 |
| No. of Recording Method | 1 | 1 | 1 | 1 | 2 | 2 | 3 | 3 | 4 | 4 |
| Filling Properties (Solid Pattern) | A | A | A | A | B | A | B | A | B | A |
| Line Width (Sub-scanning Direction) | A | A | A | A | C | A | D | A | D | B |
| Line Width (Main Scanning Direction) | A | A | A | A | D | B | D | A | D | B |
| Curing wrinkles | B | C | A | A | B | C | A | C | B | C |

From the above results, it was found that, in the ink jet recording method (each example) in which the steps of discharging and curing the ultraviolet curable ink including vinyl ether group-containing (meth)acrylic acid esters represented by General Formula (I), and a monofunctional (meth)acrylate other than the vinyl ether group-containing (meth)acrylic acid esters are included, and the viscosity of the ultraviolet curable ink at 20° C. is 7 mPa·s or more, the temperature at the time of discharge is 20 to 30° C., and the viscosity of the ultraviolet curable ink at the corresponding temperature is 13 mPa·s or less, the curability, the suppression of curing wrinkles and the line width were all excellent, and filling properties of the solid pattern image were also excellent compared to those of otherwise ink jet recording methods (each comparative examples). Hereinafter, a discussion will be described based on the above results, however, the discussion does not limit the scope of the invention.

First, in Comparative Example 2, the evaluation results were not described since the number of nozzles that did not discharge were more than half of the total number of nozzles when discharging Ink Composition 2 at the temperature of 30° C., and it was determined as non-dischargeable. It is postulated that Ink Composition 2 is an ink that is not suitable for discharging when the discharging temperature is set to 30° C. In addition, in Comparative Example 3, it is postulated that the filling properties were poor since the viscosity had been increased due to the decrease in ink temperature during the period after the ink was discharged and before the ink was landed on the recording medium even when the ink was made to be dischargeable by reducing the viscosity of the ink by heating. This also can be postulated from the fact that, when the filling properties, the line width (sub-scanning direction), and the line width (main scanning direction) were evaluated in the same manner as that of Comparative Example 3 except that the whole ink jet printer was installed in a temperature-controlled room, and the temperature-controlled room was set to 35° C., the evaluation results were all A. In addition, it was postulated that making the ink dischargeable by reducing the ink viscosity by heating the ink cannot be considered as preferable since it facilitates the erosion of the head due to the ink of members constituting the head by using a heated ink heated as well as needing a temperature adjustment mechanism, and the durability of the head tends to be reduced. Furthermore, the occurrence of curing wrinkles was significant in Comparative Examples 1, 4, 6, 10, 12 and 14. It is postulated that the occurrence of curing wrinkles was significant in all the ink compositions used in these comparative examples due to the fact that the viscosity of the ink was less than 7 mPa·s at 20° C., and the viscosity of the ink was low as described above together with the ink including vinyl ether group-containing (meth)acrylic acid esters represented by General Formula (I). In addition, the reason for the curability of the ink being poor in Comparative Examples 5 and 7 is the same as described above.

In addition, the relationship between the evaluation results and the recording method will be discussed. In Example 1 using Recording Method 1 by overlap printing, any of the line width (main scanning direction) and the suppression of curing wrinkles were found to be more excellent compared to those of Example 4 using Recording Method 2 that does not depend on overlap printing. It is postulated that, in the line width (main scanning direction) in Example 4, a phenomenon was observed in which dots did not spread since dots adjacently formed in the main scanning direction in one path attracted each other, therefore, the line width deteriorated. In addition to this, it is postulated that the result of curing wrinkles worsened due to the occurrence of a thick portion in the dots due to the dots attracting each other. Furthermore, in the line width of the sub-scanning direction, it was identified that there was no change regardless of the use of overlap printing since there was no possibility of forming adjacent dots in one path.

In addition, it was postulated that the reason for a very poor evaluation result in the line width in Comparative Example 11 (Recording Method 3) in which the distance between the nozzle surface and the recording surface of the recording medium surface was made to be large at 10 mm compared to that of Comparative Example 3 in which Recording Method 1 was performed (distance 1 mm) using the same Ink 2 was because of further viscosity increase due to further ink temperature decrease before the ink reached the recording medium. Furthermore, in Example 1 using Recording Method 1 using a serial printer, any of the solid pattern image, filling properties of the line width (sub-scanning direction and main scanning direction), and suppression of curing wrinkles was found to be more excellent compared to those of Example 6 using Recording Method 4 using a line printer. The reason is postulated such that, in the line printer, the adjacent dots attracted each other to form adjacent dots in one path in any direction of the transport direction (main scanning direction) of the recording medium and the width direction (sub-scanning direction) of the recording medium, therefore, the line width and the like was inferior in Example 6.

Furthermore, separately, curing was carried out using a metal halide lamp replacing an LED, and the result of curing wrinkles became more favorable overall, however, the deformation of the recording medium was observed due to the heat generated from the light source. In addition to this, the light source became larger and thereby power consumption was increased due to the use of a metal halide lamp. As a result, the inventors confirmed that using an LED was more preferable than using a metal halide lamp.

Example of Second Embodiment

Hereinafter, the second embodiment will be described in detail using examples and comparative examples, however, the invention is not limited to these examples. The compositions used in the adjustment of the ink adjustment examples, the materials used, adjustment method of the ink, measurement and evaluation items of this embodiment were the same as those used in the examples of the first embodiment described above.

Evaluation of Recording Test

A recording test was performed and evaluated in the same manner as that of Recording Methods 1 to 4 in the examples of the first embodiment described above except that the recording method was performed under the recording conditions described below using the following Serial Ink Jet Printer 2 as the recording apparatus. Serial Ink Jet Printer 2 was the same as the serial ink jet printer used in the examples of the first embodiment (referred to as Serial Ink Jet Printer 1) except for the following. One more LED having a peak wavelength of 395 nm that was the same type as the LED mounted on the side of the head as the Light Source 2 further downstream in the sub-scanning direction than the head of the carriage was mounted. The length of the sub-scanning direction of the Light Source 2 was made to be the same as the length of the sub-scanning direction of the head. The two LEDs mounted next to the left and right sides of the head in the same manner as those in a Serial Ink Jet Printer 1 were employed as Light Source 1. The light source provided further downstream in sub-scanning direction than the platen separately from the carriage was not used in irradiation by turning off the power. The peak intensity of irradiation of Light Source 1 and Light Source 2 was set to values listed in Tables 5 and 6 for each example by adjusting the input current values, respectively. The irradiation energy near one path per one LED 1 of the Light Source 1, and Light Source 2, respectively, was 100 mJ/cm$^2$ in the examples in which the peak intensity of irradiation was 1,000 mW/cm$^2$. The nozzle density of the head was 360 dpi, and the number of nozzles was 360.

Recording Method 4 was the same as Recording Method 1 except that the number of paths (number of main scannings) was set to one path (main scanning direction)×one path (sub-scanning direction)=one path" by completing the discharging step of the area having the length of the distance of the head in the sub-scanning direction of the recording medium in one path with the distance in one-time sub-scanning direction as the distance of one sub-scanning one-time of the head, using the above Serial Ink Jet Printer 2 in which the head was changed to that having the nozzle density of 720 dpi and the number of nozzles 720. As the evaluation criteria, the following evaluation of uneven luster was performed in addition to the items described above. The evaluation results are shown in Tables 4 and 5.

Evaluation of Uneven Luster

Each solid pattern image obtained in 2. Evaluation of Filling Properties of Solid Pattern Image described above was used. When a light reflection on the image was seen with the image at an angle in which the reflected light of a fluorescent lamp of the ceiling could be seen, the luster of the sub-scanning direction at the time of recording of the image was different, that is, the luster of the main scanning direction was constant, therefore, the boundary of the area in which the luster of the sub-scanning direction was different being recognized as a line (luster banding) extending in the main scanning direction was visually observed. The evaluation criteria were as follows.

A: The line extending in the main scanning direction was seen.

B: The line extending in the main scanning direction was not seen.

TABLE 4

| Item | \multicolumn{14}{c}{No. of Examples Example} |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| No. of Ink Used. | 1 | 8 | 9 | 1 | 1 | 1 | 1 | 1 | 4 | 6 | 7 | 1 | 1 | 8 |
| Irradiation Intensity of Light Source 1 (mW/cm$^2$) | 1000 | 1000 | 1000 | 1000 | 1000 | 1000 | 1000 | 1000 | 1000 | 1000 | 1000 | 800 | 500 | 500 |
| Irradiation Intensity of Light Source 2 (mW/cm$^2$) | 1000 | 1000 | 1000 | 1000 | 1000 | 1000 | 1000 | 1000 | 1000 | 1000 | 1000 | 800 | 1000 | 1000 |
| Temperature of Ink at Time of Discharge (° C.) | 25 | 25 | 25 | 25 | 25 | 25 | 30 | 20 | 25 | 25 | 25 | 25 | 25 | 25 |
| Rank of Ink Viscosity at Time of Discharge | 2 | 2 | 2 | 2 | 2 | 2 | 2 | 2 | 2 | 2 | 2 | 2 | 2 | 2 |
| No. of Recording Method | 1 | 1 | 1 | 2 | 3 | 4 | 1 | 1 | 1 | 1 | 1 | 1 | 1 | 1 |
| Filling Properties (Solid Pattern) | A | A | A | A | A | A | A | A | A | A | A | A | A | A |
| Line Width (Sub-scanning Direction) | A | A | A | A | A | B | A | A | A | A | A | A | A | A |
| Line Width (Main Scanning Direction) | A | A | A | B | A | B | A | A | A | A | A | A | A | A |
| Curing wrinkles | A | A | A | B | A | B | A | A | B | A | A | B | B | B |
| Uneven Luster | B | B | B | B | B | B | B | B | B | B | B | B | A | A |

TABLE 5

| Item | \multicolumn{14}{c}{No. of Examples Comparative Example} |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| No. of Ink Used. | 3 | 2 | 2 | 3 | 5 | 2 | 3 | 2 | 3 | 2 | 3 | 1 | 8 | 2 |
| Irradiation Intensity of Light Source 1 (mW/cm$^2$) | 1000 | 1000 | 1000 | 1000 | 1000 | 1000 | 1000 | 1000 | 1000 | 1000 | 1000 | 500 | 500 | 500 |
| Irradiation Intensity of Light Source 2 (mW/cm$^2$) | 1000 | 1000 | 1000 | 1000 | 1000 | 1000 | 1000 | 1000 | 1000 | 1000 | 1000 | 500 | 500 | 500 |
| Temperature of Ink at Time of Discharge (° C.) | 35 | 30 | 35 | 25 | 25 | 35 | 25 | 35 | 25 | 35 | 25 | 25 | 25 | 35 |
| Rank of Ink Viscosity at Time of Discharge | 1 | 3 | 2 | 1 | 1 | 2 | 1 | 2 | 1 | 2 | 1 | 2 | 2 | 2 |
| No. of Recording Method | 1 | 1 | 1 | 1 | 1 | 2 | 2 | 3 | 3 | 4 | 4 | 1 | 1 | 1 |
| Filling Properties (Solid Pattern) | A | — | B | A | A | B | A | B | A | B | A | A | A | A |
| Line Width (Sub-scanning Direction) | A | — | C | A | A | C | A | D | A | D | B | A | A | C |
| Line Width (Main Scanning Direction) | A | — | C | A | A | D | B | D | A | D | B | A | A | C |
| Curing wrinkles | C | — | A | C | C | B | C | A | C | B | C | C | C | B |
| Uneven Luster | B | B | B | B | B | B | B | B | B | B | B | A | A | A |

From the above results, it was found that, in the ink jet recording method which included the discharging step for discharging the ultraviolet curable ink of which viscosity was 7 mPa·s or more at 20° C. from the head toward the recording medium, and the step for curing the ultraviolet curable ink adhered to the recording medium, wherein, in the discharging step, the temperature of the ultraviolet curable ink discharged was 20 to 30° C., and the viscosity of the ultraviolet curable ink at the temperature was 13 mPa·s or less, and in the curing step, the ultraviolet curable ink was cured by irradiating with ultraviolet light having a peak intensity of 800 mW/cm$^2$ or more from a ultraviolet light emitting diode having an emission peak wavelength in the range of 360 to 420 nm, the filling properties of the solid pattern image, the line width, and suppression of curing wrinkles were all excellent compared to those of otherwise ink jet recording methods. Hereinafter, a discussion will be described based on the above results, however, the discussion does not limit the scope of the invention in any way. In addition, the discussion described above also applies regarding the examples having the same contents as the examples and the comparative examples of the first embodiment.

In Comparative Example 3, it is postulated that the filling properties were poor since the viscosity had been increased due to the decrease in ink temperature during the period after the ink was discharged and before the ink was landed on the recording medium even when the ink was heated to 35° C., however, a tendency of the filling properties and the line width being not constant was also seen during the test depending on the degree of viscosity increase of the ink due to a decrease in the ink temperature, therefore, it was not preferable. In Comparative Examples 12 to 14 that did not include the curing step for curing the ultraviolet curable ink by irradiating with ultraviolet light having a peak intensity of 800 mW/cm² or more from a ultraviolet light emitting diode having an emission peak wavelength in the range of 360 to 420 nm, a tendency of inferior suppression of curing wrinkles was seen. It is postulated that curing wrinkles had occurred on the ink surface when the inside of the ink was cured since the curing of the inside of the coating ink was delayed compared to the curing of the surface of the ink while the ink was cured gradually by irradiating with ultraviolet light of weak intensity.

Examples 13 and 14 were examples including a curing step using Light Source 1 that cured the ultraviolet curable ink by irradiating with ultraviolet light having a peak intensity of 800 mW/cm² or more from a ultraviolet light emitting diode having an emission peak wavelength in the range of 360 to 420 nm, and a curing step using Light Source 1 that was the first irradiation (curing step) after the ink being landed on the recording medium, and cured the ultraviolet curable ink by irradiating with ultraviolet light having a peak intensity of less than 800 mW/cm², however, in Examples 13 and 14, the suppression of curing wrinkles was slightly inferior but favorable, and it was favorable in having no uneven luster compared to that of other examples in which the peak intensity in the curing step using Light Source 1 was 800 mW/cm² or more. The reason for this has not been fully elucidated, however, it is postulated that, if the peak intensity of irradiation of the first irradiation was less than 800 mW/cm², the curing step was performed in which the dots having the surface of the ink that had landed by the earlier main scanning had not completely cured, and the dots landed overlapping with the earlier dots by the next main scanning were irradiated simultaneously, and it was difficult for the level difference of the ink surface of the boundary to remain, therefore, uneven luster reduced. In Example 6, and Comparative Examples 10 and 11 using Recording Method 4, uneven luster in the sub-scanning direction (line extending in the main scanning direction) was seen with an interval of the distance of the head in the sub-scanning direction. In the examples recording using Recording Methods 1 to 3 in which uneven luster was seen, uneven luster was seen with an interval shorter than the distance of the head in the sub-scanning direction. In addition, in the examples in which the evaluation of curing wrinkles was C, the difference of luster could be observed as uneven luster in the evaluation of uneven luster that observed the reflected light on the image.

The entire disclosure of Japanese Patent Application No.:2012-235414, filed Oct. 25, 2012 and 2012-76469, filed Mar. 29, 2012 and 2012-202377, filed Sep. 14, 2012 are expressly incorporated by reference herein.

What is claimed is:

1. An ink jet recording method comprising:
   discharging a ultraviolet curable ink containing vinyl ether group-containing (meth)acrylic acid esters represented by the following General Formula (I), and a monofunctional (meth)acrylate other than the vinyl ether group-containing (meth)acrylic acid esters, and of which viscosity is 7 mPa·s or more at 20° C., from a head toward a recording medium; and
   curing the ultraviolet curable ink adhered to the recording medium,
   wherein, in the discharging, the temperature of the ultraviolet curable ink discharged is 20 to 30° C., and the viscosity of the ultraviolet curable ink at the temperature is 13 mPa·s or less, $$CH_2=CR^1-COOR^2\text{-}0\text{-}CH=CH-R^3 \qquad (I),$$

in the formula, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms,
   wherein the monofunctional (meth)acrylate contains a monofunctional (meth)acrylate having an aromatic ring skeleton.

2. The ink jet recording method according to claim 1, wherein recording is performed by alternately performing main scanning in which the discharging is carried out while moving the head in the main scanning direction, and the curing is carried out, and
   sub-scanning in which the relative position of the head and the recording medium is changed in the sub-scanning direction intersecting with the main scanning direction.

3. The ink jet recording method according to claim 1, wherein there is 40 to 80% by mass of the vinyl ether group-containing (meth)acrylic acid esters with respect to the total mass of the ultraviolet curable ink.

4. The ink jet recording method according to claim 1, wherein there is 10 to 50% by mass of the monofunctional (meth)acrylate with respect to the total mass of the ultraviolet curable ink.

5. The ink jet recording method according to claim 1, wherein, in the curing, ultraviolet light having irradiation energy of 500 mJ/cm² or less from a ultraviolet light emitting diode having an emission peak wavelength in the range of 360 to 420 nm is irradiated, and the ultraviolet curable ink is cured.

6. The ink jet recording method according to claim 1, wherein, in the curing, the ultraviolet curable ink is irradiated with ultraviolet light having a peak intensity of 800 mW/cm² or more from a ultraviolet light emitting diode having an emission peak wavelength in the range of 360 to 420 nm, and the ultraviolet curable ink is cured.

7. The ink jet recording method according to claim 2, wherein, when a unit region that forms dots is employed as a pixel, and an array of pixels arranged in a main scanning direction is employed as a raster line, there is a raster line including pixels intended to form a dot by another main scanning in between raster lines including pixels intended to form a dot by one main scanning in a subscanning direction, and a plurality of raster lines arranged in the sub-scanning direction includes a raster line made of pixels intended to form a dot by a certain main scanning, and pixels intended not to form a dot by a certain main scanning but form a dot by another round of main scanning.

8. The ink jet recording method according to claim 1, wherein a distance between a nozzle surface of the head and a recording surface of the recording medium is 5 mm or more.

9. A ultraviolet curable ink used in the ink jet recording method according to claim 1.

10. An ink jet recording method comprising:
    discharging a ultraviolet curable ink of which viscosity is 7 mPa·s or more at 20° C. from a head toward a recording medium; and
    curing the ultraviolet curable ink adhered to the recording medium,
    wherein, in the discharging, the temperature of the ultraviolet curable ink discharged is 20 to 30° C., and the viscosity of the ultraviolet curable ink at the temperature is 13 mPa·s or less, wherein, in the curing, the ultraviolet curable ink is cured by irradiating with ultraviolet light having a peak intensity of 800 mW/cm² or more and 2000 mW/cm² of less from a ultraviolet light emitting diode having an emission peak wavelength in the range of 360 to 420 nm.

11. The ink jet recording method according claim 10, wherein recording is performed by alternately performing main scanning in which the discharging is carried out while moving the head in the main scanning direction, and sub-scanning in which the relative position of the head and the recording medium is changed in the sub-scanning direction intersecting with the main scanning direction, and the main scanning includes curing the ultraviolet curable ink adhered to the recording medium.

12. The ink jet recording method according to claim 10, wherein a light source arranged in the main scanning direction of the head is provided, and recording is performed by alternately performing main scanning in which the discharging is carried out while moving the head in the main scanning direction, and sub-scanning in which the relative position of the head and the recording medium is changed in the sub-scanning direction intersecting with the main scanning direction, the main scanning includes curing the ultraviolet curable ink adhered to the recording medium, a light source is provided at a downstream side in the sub-scanning direction of the head, and a curing is further performed after the curing included in the main scanning.

13. The ink jet recording method according to claim 10, wherein at least one of the curing included in the main scanning and the curing further performed after the curing included in the main scanning includes curing the ultraviolet curable ink by irradiating with ultraviolet light having a peak intensity of 800 mW/cm² or more from a ultraviolet light emitting diode having an emission peak wavelength in the range of 360 to 420 nm.

14. The ink jet recording method according to claim 12, wherein the curing further performed after the curing included in the main scanning includes curing the ultraviolet curable ink by irradiating with ultraviolet light having a peak intensity of 800 mW/cm² or more from a ultraviolet light emitting diode having an emission peak wavelength in the range of 360 to 420 nm, and the curing included in the main scanning includes curing the ultraviolet curable ink by irradiating with ultraviolet light having a peak intensity of less than 800 mW/cm² from a ultraviolet light emitting diode having an emission peak wavelength in the range of 360 to 420 nm.

15. The ink jet recording method according to claim 10, wherein the curing is performed using a plurality of curing, and the first curing performed after the discharging includes curing the ultraviolet curable ink by irradiating with ultraviolet light having a peak intensity of less than 800 mW/cm² from a ultraviolet light emitting diode having an emission peak wavelength in the range of 360 to 420 nm, and the curing performed after the above curing includes curing the ultraviolet curable ink by irradiating with ultraviolet light having a peak intensity of 800 mW/cm² or more from a ultraviolet light emitting diode having an emission peak wavelength in the range of 360 to 420 nm.

16. The ink jet recording method according to claim 10, wherein the ink contains 40 to 80% by mass of a monofunctional (meth)acrylate with respect to the total mass of the ink.

17. The ink jet recording method according to claim 10, wherein the ink contains 5 to 45% by mass of a polyfunctional (meth)acrylate with respect to the total mass of the ink.

18. The ink jet recording method according to claim 10, wherein a sum of the irradiation energy due to the curing is 500 mJ/cm² or less.

19. The ink jet recording method according to claim 11, wherein, when a unit region that forms dots is employed as a pixel, and an array of pixels arranged in a main scanning direction is employed as a raster line, there is a raster line including pixels intended to form a dot by another main scanning in between raster lines including pixels intended to form a dot by one main scanning in a sub-scanning direction, and a plurality of raster lines arranged in the sub-scanning direction includes a raster line made of pixels intended to form a dot by a certain main scanning, and pixels intending not to form a dot by a certain main scanning and form a dot by another round of main scanning.

20. The ink jet recording method according to claim 10, wherein the ultraviolet curable ink containing vinyl ether group-containing (meth)acrylic acid esters represented by the following general formula (I),

(I), in the formula $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

* * * * *